(12) United States Patent
Ueno et al.

(10) Patent No.: US 8,326,939 B2
(45) Date of Patent: Dec. 4, 2012

(54) STORAGE SYSTEM THAT TRANSFERS SYSTEM INFORMATION ELEMENTS

(75) Inventors: Koichi Ueno, Odawara (JP); Koji Nagata, Kaisei (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 518 days.

(21) Appl. No.: 12/068,088

(22) Filed: Feb. 1, 2008

(65) Prior Publication Data

US 2009/0037555 A1   Feb. 5, 2009

(30) Foreign Application Priority Data

Jul. 30, 2007   (JP) .................. 2007-198140

(51) Int. Cl.
G06F 15/16   (2006.01)
(52) U.S. Cl. ......... 709/213; 709/201; 709/203; 709/220
(58) Field of Classification Search .................. 709/213, 709/201, 203, 220
See application file for complete search history.

(56) References Cited

U.S. PATENT DOCUMENTS

| | | | |
|---|---|---|---|
| 6,145,066 A * | 11/2000 | Atkin ........................... | 711/165 |
| 7,100,016 B2 | 8/2006 | Yamamoto et al. | |
| 7,213,115 B2 | 5/2007 | Sato et al | |
| 7,305,533 B2 | 12/2007 | Sato et al. | |
| 7,600,092 B2 | 10/2009 | Yamamoto et al. | |
| 7,865,687 B2 | 1/2011 | Yamamoto et al. | |
| 2003/0159058 A1 | 8/2003 | Eguchi et al. | |
| 2003/0229764 A1 | 12/2003 | Ohno et al. | |
| 2004/0049553 A1 | 3/2004 | Iwamura et al. | |
| 2005/0278584 A1* | 12/2005 | Asami et al. .................. | 714/45 |
| 2006/0047863 A1 | 3/2006 | Awakura | |
| 2007/0260840 A1* | 11/2007 | Watanabe .................... | 711/165 |
| 2008/0019316 A1* | 1/2008 | Imai .............................. | 370/331 |
| 2008/0046671 A1* | 2/2008 | Sato et al. .................... | 711/162 |
| 2008/0235404 A1 | 9/2008 | Awakura | |
| 2008/0243864 A1* | 10/2008 | McGauley et al. ............ | 707/10 |
| 2011/0010518 A1* | 1/2011 | Kavuri et al. ................. | 711/165 |

FOREIGN PATENT DOCUMENTS

| | | |
|---|---|---|
| EP | 1 577 748 A1 | 10/2004 |
| JP | 10-232816 A | 9/1998 |
| JP | 11-282656 A | 10/1999 |
| JP | 2004-102374 | 9/2002 |
| JP | 2005-182708 A | 7/2005 |
| JP | 2006-72440 A | 3/2006 |
| JP | 2006-127398 A | 5/2006 |
| JP | 2007-018539 A | 1/2007 |

OTHER PUBLICATIONS

Extended European Search Report dated Nov. 6, 2008 regarding European Application No. 08250226.1-1245.

* cited by examiner

*Primary Examiner* — Lan-Dai T Truong
(74) *Attorney, Agent, or Firm* — Volpe and Koenig, P.C.

(57) ABSTRACT

A first storage system that has a first storage device comprises a first interface device that is connected to a second interface device that a second storage system has. A first controller of the first storage system reads system information elements of first system information (information relating to the constitution and control of the first storage system) from a first system area (a storage area that is not provided for the host of the first storage device) and transfers the system information elements or modified system information elements to the second storage system via the first interface device. The system information elements are recorded in a second system area in a second storage device that the second storage system has.

9 Claims, 28 Drawing Sheets

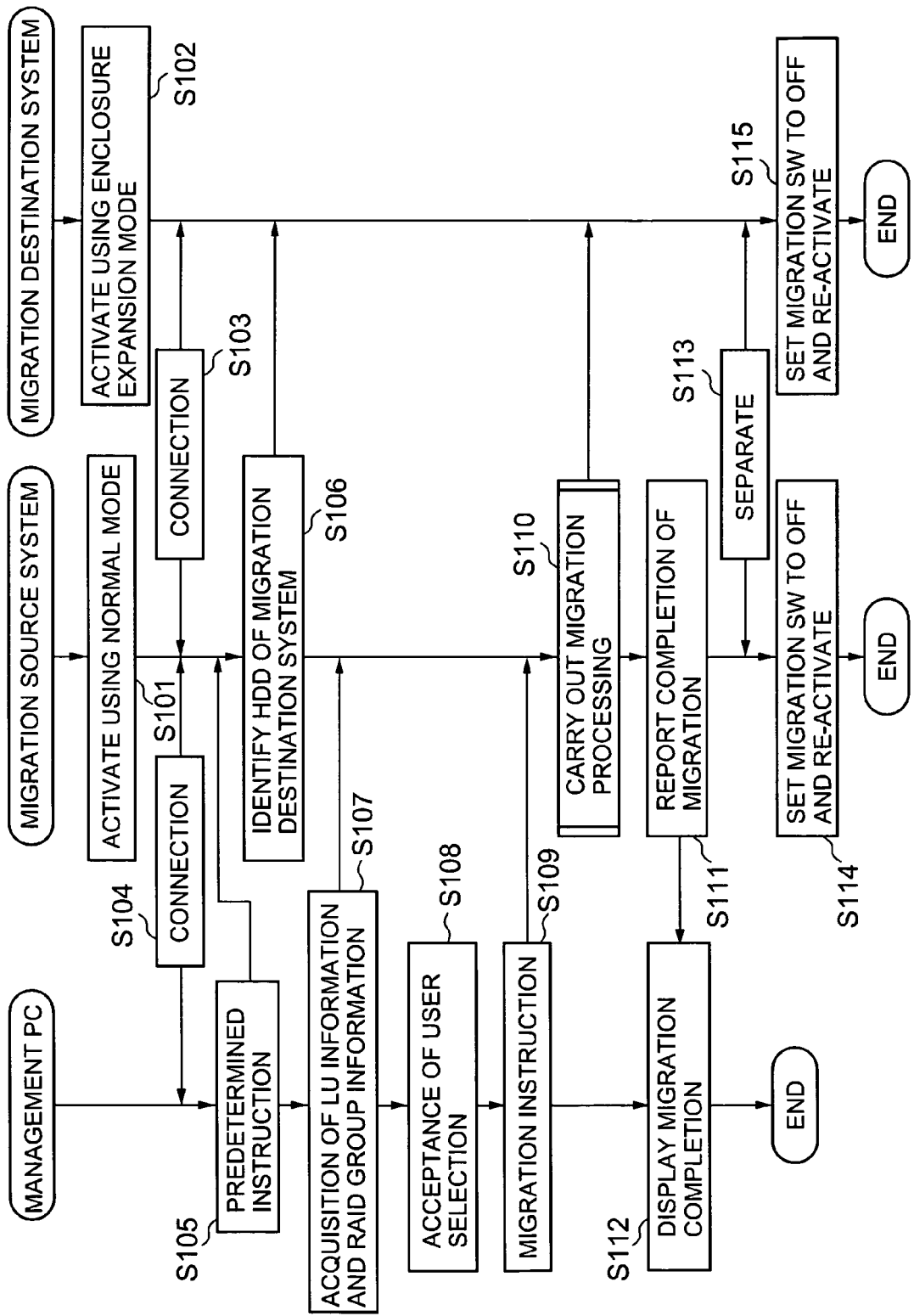

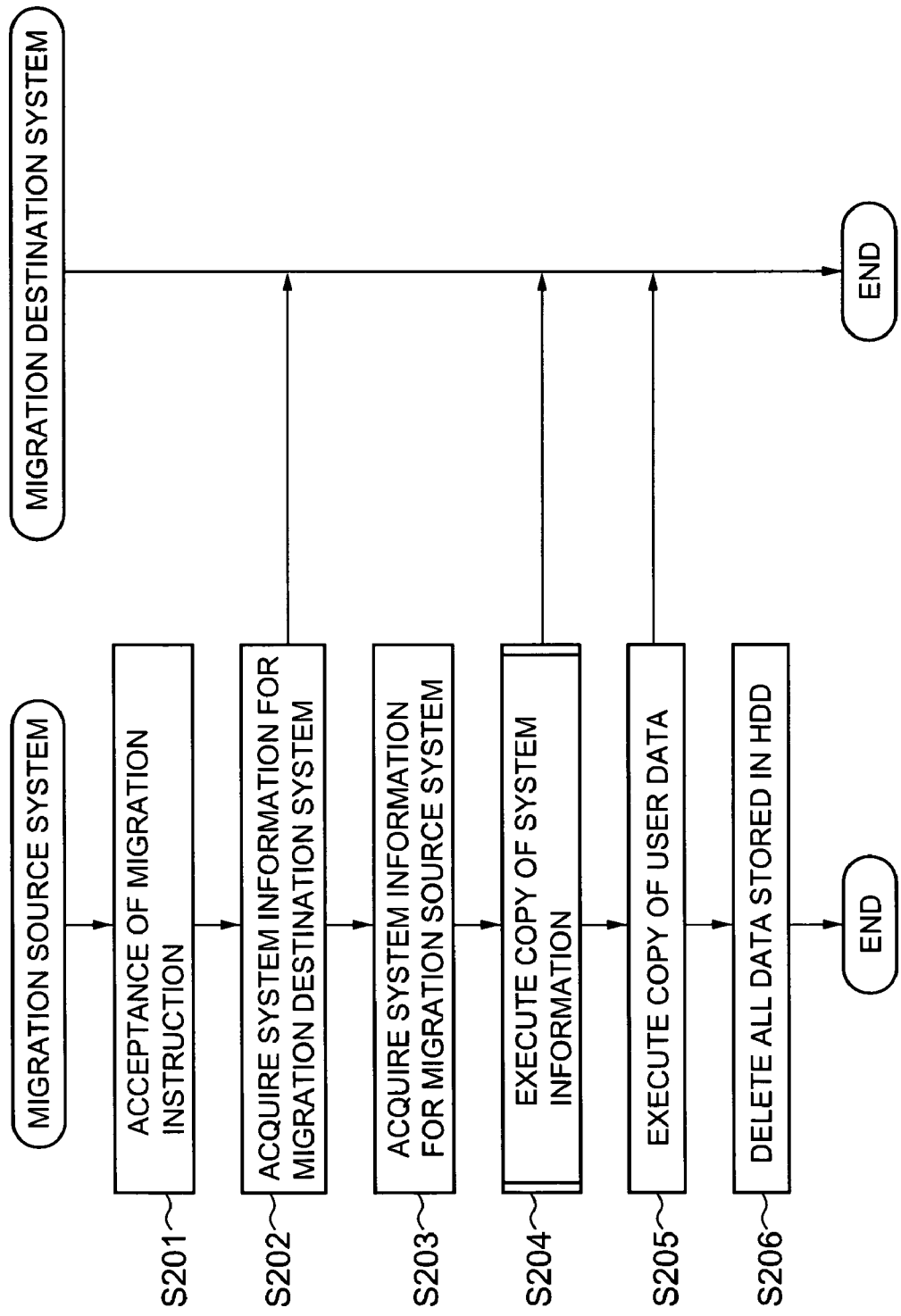

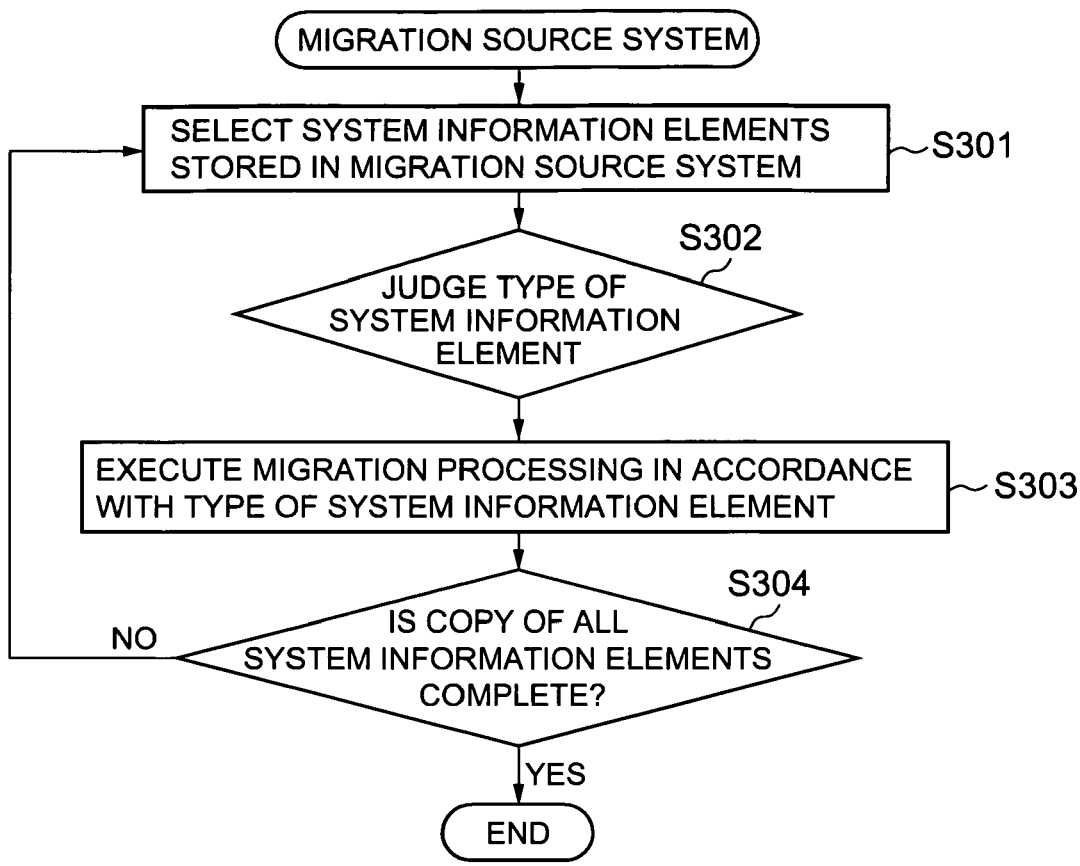
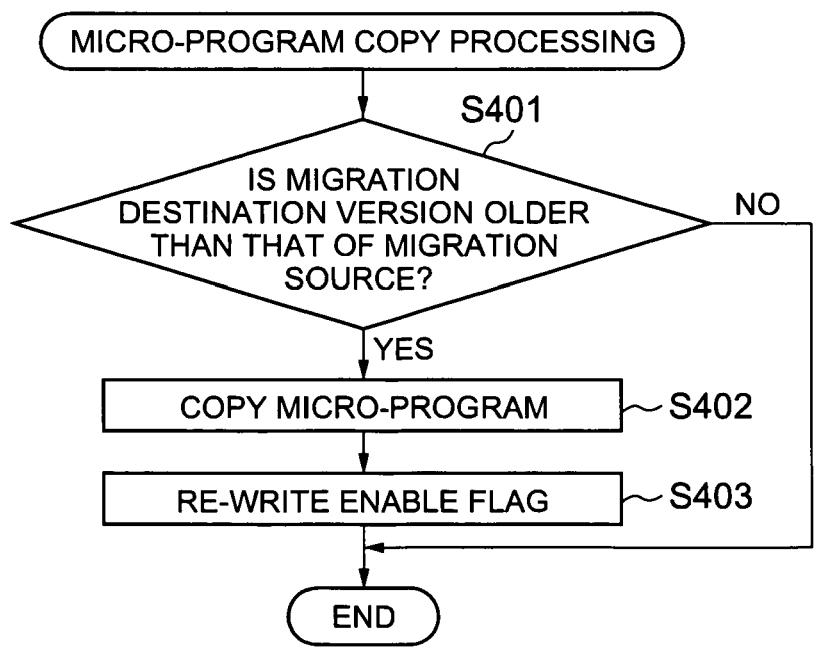

FIG. 24

ROUTING TABLE 2146

| Phy NUMBER | Phy STATE | Phy ATTRIBUTE | SAS ADDRESS | ... |
|---|---|---|---|---|
| #0 | enable | Table | AAAAA | ... |
| ... | ... | ... | ... | ... |
| #15 | enable | Subtractive | Ababab | ... |
| ... | ... | ... | ... | ... |
| #19 | enable | Subtractive | Xyxyxy | ... |
| ... | ... | ... | ... | ... |

FIG. 27A

| # | DEFINE MODE | MAIN SW | MIGRATION SW | SUMMARY |
|---|---|---|---|---|
| 1 | NORMAL MODE (CTL ON MODE) | ON | OFF | CTL IS OPERATING NORMALLY |
| 2 | CTL OFF MODE | OFF | - | CTL IS STOPPED. ALTHOUGH THE STATE OF THE MIGRATION SW DOES NOT FLUCTUATE, THE SAS ADDRESS OF THE EXPANDER IS THE DEFAULT ADDRESS. |
| 3 | ENCLOSURE EXPANSION MODE | ON | ON | MODE THAT PERMITS IDENTIFICATION FOR SUITABLE ENCLOSURE EXPANSION VIA DEDICATED DATA MIGRATION PORT |

FIG. 27B

| # | | NORMAL MODE | ENCLOSURE EXPANSION MODE |
|---|---|---|---|
| 1 | Phy STATE OF DEDICATED DATA MIGRATION PORT (phy) | disable | enable |
| 2 | Phy STATE OF SAS CONTROLLER CONNECTION PORT (phy) | enable | disable |
| 3 | SAS ADDRESS | DEFAULT | DIFFERS FROM DEFAULT |
| 4 | Phy ATTRIBUTE OF DEDICATED DATA MIGRATION PORT | TABLE ATTRIBUTE | SUBTRACTIVE ATTRIBUTE |

FIG. 27C

| DOWNSTREAM EXPANDER \ UPSTREAM EXPANDER | TABLE ATTRIBUTE | SUBTRACTIVE ATTRIBUTE |
|---|---|---|
| TABLE ATTRIBUTE | x (STANDARD VIOLATION) | - (UPSTREAM AND DOWNSTREAM OPPOSITE) |
| SUBTRACTIVE ATTRIBUTE | O | O (ONLY ONE LOCATION IN DOMAIN. BOTH DIRECTIONS CONSIDERED TO BE UPSTREAM) |

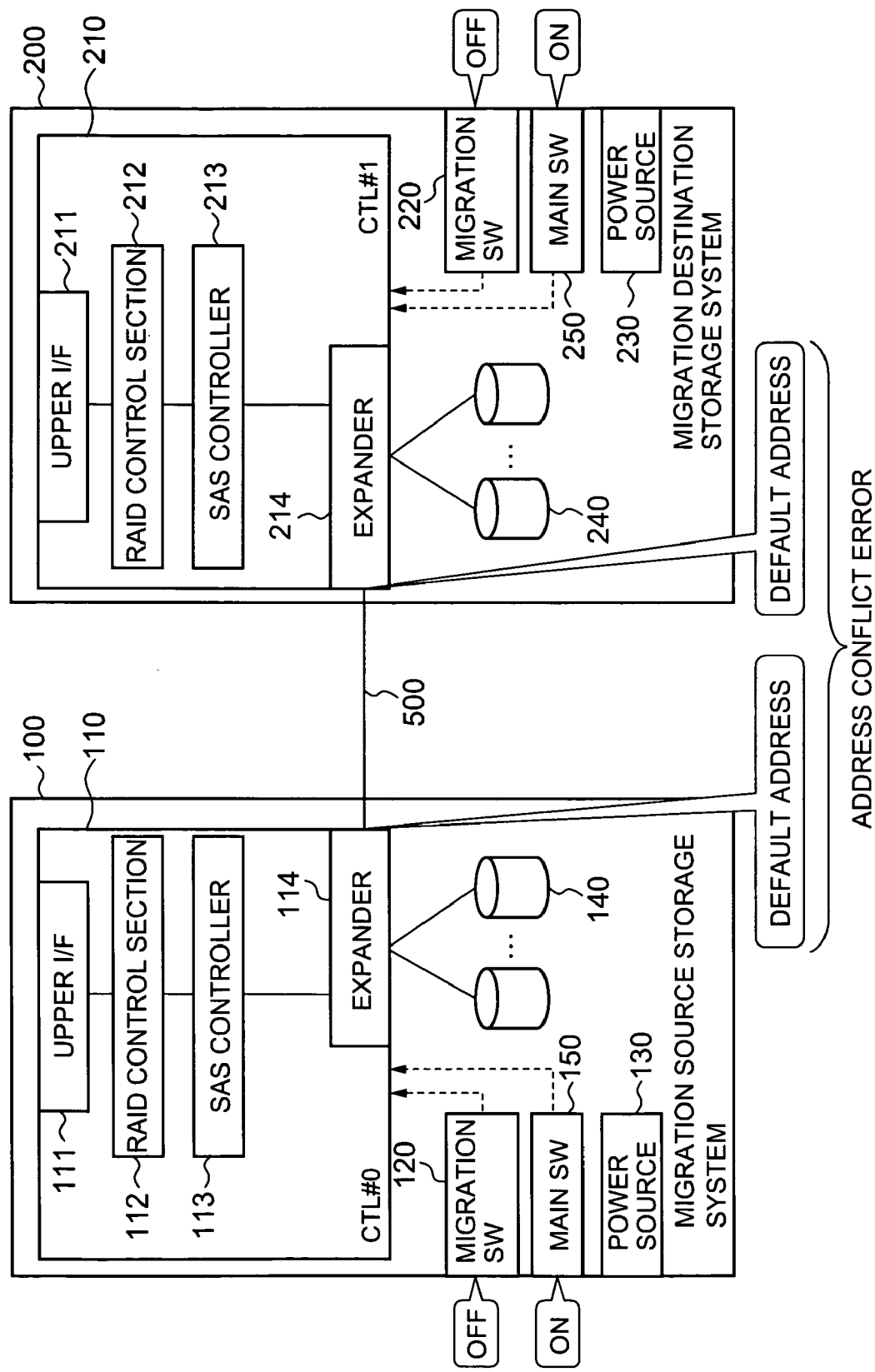

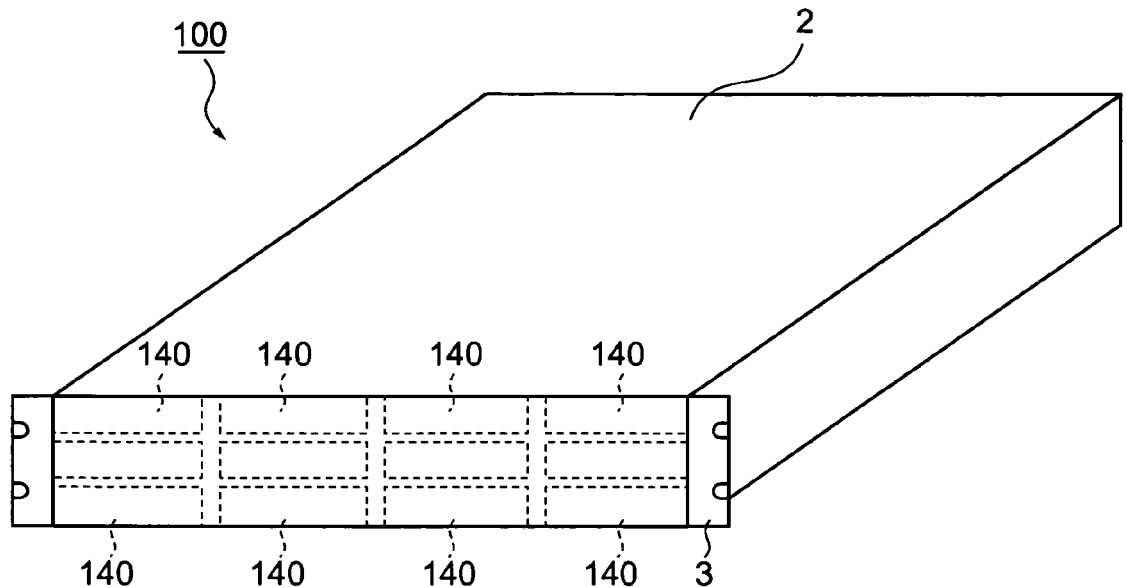

STORAGE SYSTEM THAT TRANSFERS SYSTEM INFORMATION ELEMENTS

CROSS-REFERENCE TO PRIOR APPLICATION

This application relates to and claims the benefit of priority from Japanese Patent Application number 2007-198140 filed on Jul. 30, 2007 the entire disclosure of which is incorporated herein by reference.

BACKGROUND

The present invention generally relates to data migration between storage systems.

Conventionally, as an example of a method for performing data migration between storage systems, for example, a method where the host reads the migration target data from a storage device of a migration source storage system and writes the data thus read to a storage device of a migration destination storage system is known (Japanese Application Laid Open No. 2004-102374).

In the above data migration method, in a case where the constitution is different between the migration source storage system and the migration destination storage system, it is necessary for the user to manually set the system information of the migration destination storage system. For example, in the case where the number of hard disks, the capacity thereof, and so forth differ between the two storage systems, it is necessary to redefine the RAID groups which are defined as sets of hard disks as well as the LUs which have been defined in association with the RAID groups, and so forth.

Also, when the storage system has been replaced, since the migration destination storage system is a new storage system, it is necessary to set the individual information, functions, and so forth that the storage system comprises in addition to the logical constitution of RAID groups and storage devices such as LUs.

However, having the user manually set the system information of the migration destination storage system after the data migration is troublesome work for the user.

SUMMARY

Thus, an object of the present invention is to allow the setting of system information for the migration destination storage system to be performed while placing only a small burden on the user.

A first controller of a first storage system reads out the system information elements of first system information (information that relates to the constitution and control of the first storage system) from a first system area (the storage area in the first storage device that is not provided for the host), and transmits the system information elements as well as modified system information elements that are to be transferred to a second storage system. Those system information elements are recorded in the second system area in the second storage device that the second storage system comprises.

BRIEF DESCRIPTION OF THE DRAWINGS

FIG. 9 is a flowchart showing the data migration procedure according to this embodiment;

FIG. 10 is a flowchart showing migration processing according to this embodiment;

FIG. 11 is a flowchart showing system information migration processing according to this embodiment;

FIG. 12 is a flowchart showing migration processing relating to a micro-program;

FIG. 24 shows a constitutional example of a routing table;

FIG. 27A is an explanatory diagram of various modes of the storage system;

FIG. 27B is an explanatory diagram of the relationship between the normal mode and an enclosure expansion mode, predetermined types of phy attributes and states, and the SAS address of the expander;

FIG. 27C is an explanatory diagram of the relationship of the phy attributes;

FIG. 28 shows a scheme for data protection in cases where both the migration source system and migration destination system are erroneously in normal mode;

FIG. 29 provides an external perspective view of the storage system according to the first embodiment of the present invention; and FIG. 30 shows a constitutional example of an address map that the SAS controller holds.

DETAILED DESCRIPTION OF THE PREFERRED EMBODIMENTS

Figure 1:
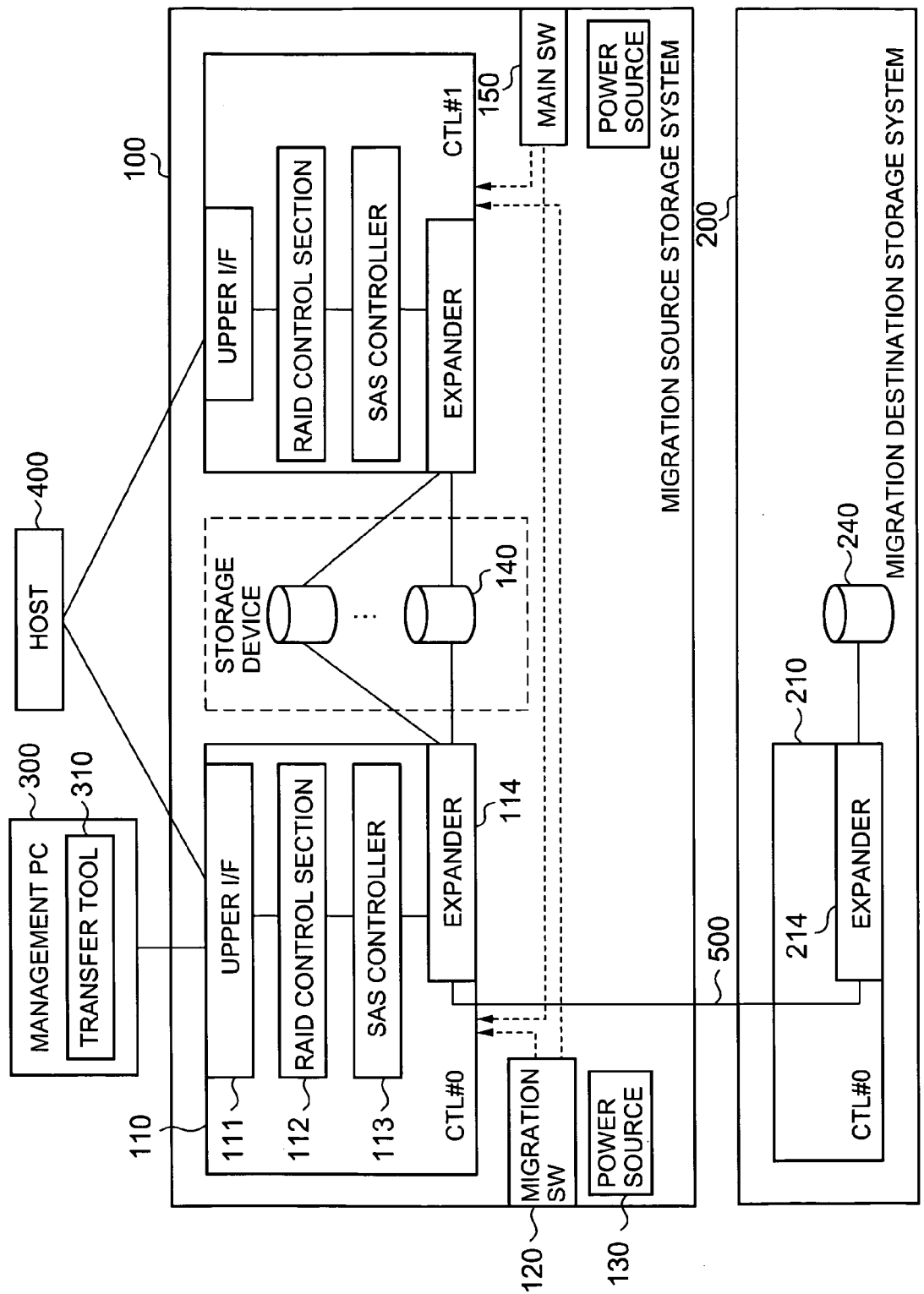
FIG. 1 shows a constitutional example of a storage system comprising a data migration control device according to a first embodiment.

In an embodiment 1, there is a system that is constituted by a first storage system and a second storage system. The first storage system comprises a first switch device having a plurality of physical ports, a first storage device that is physically connected to one or more first physical ports of the plurality of physical ports, and a first controller that is physically connected to one or more second physical ports of the plurality of physical ports. The second storage system comprises a second switch device having a plurality of physical ports, a second storage device that is physically connected to one or more fourth physical ports of the plurality of physical ports, and a second controller that is physically connected to one or more fifth physical ports of the plurality of physical ports. One or more third physical ports of the plurality of physical ports that the first switch device comprises and one or more sixth physical ports of the plurality of physical ports that the second switch device comprises are physically connected to one another without passing through a host. The first controller accesses the second storage device via one or more third physical ports of the first switch device and one or more sixth physical ports of the second switch device.

In the first and second embodiments described in detail hereinbelow, the migration of data is executed via one or more third physical ports of the first switch device and one or more sixth physical ports of the second switch device. However, the above embodiment is not restricted to such data migration execution and the second storage system may also be used as a simple expansion system of a first storage system. For example, the first controller provides the host with a logical volume that is formed on the basis of the second storage device and may, in cases where an I/O command designating the logical volume is received from the host, access the second storage device in response to the I/O command.

In an embodiment 2, according to embodiment 1, the second controller and/or second switch device disconnects between one or more fifth physical ports and the second controller in the event of a predetermined input.

In an embodiment 3, according to at least one of the embodiments 1 and 2, in cases where the states of both physical ports that are physically connected to one another are enable, both the physical ports can be logically connected. The states of the one or more sixth physical ports are disable. The second switch device changes the states of the one or more sixth physical ports from disable to enable in the event of a predetermined input.

In an embodiment 4, according to the embodiment 3, wherein the second switch device changes the states of the one or more sixth physical ports from enable to disable in the event that the predetermined input is cancelled.

In an embodiment 5, according to at least one of the embodiments 1 to 4, wherein the states of the one or more third physical ports are initially disable; and the first switch device changes the states of the one or more third physical ports from disable to enable in cases where a predetermined instruction is received in a state where there is no predetermined input.

In an embodiment 6, according to at least one of the embodiments 1 to 5, wherein the address of the second switch device is a default address that is determined using a predetermined rule. The second switch device changes the address of the second switch device from the default address to another address in the event of a predetermined input.

In an embodiment 7, according to the embodiment 6, wherein the second switch device restores the address of the second switch device from the other address to the default address in the event of the cancellation of the predetermined input.

In an embodiment 8, according to at least one of the embodiments 1 to 7, wherein physical port attributes include a first attribute and a second attribute and, in cases where physical ports that are physically connected to one another each have the first attribute, a logical connection between the physical ports is impossible but, in cases where the attribute of an upstream physical port is the first attribute and the attribute of a downstream physical port is the second attribute, a logical connection between the physical ports is possible. The second switch device changes the attribute of the one or more third physical ports to the second attribute in the event of a predetermined input.

In an embodiment 9, according to the embodiment 5, wherein the predetermined instruction is an instruction that is issued by the first controller in response to the first controller receiving a migration instruction. The first controller transfers data stored in the first storage device to the second storage device via the one or more third physical ports of the first switch device and the one or more sixth physical ports of the second switch device.

In an embodiment 10, according to at least one of the embodiments, wherein the second storage system further comprises a mode designation section which is a user interface with which the user designates the mode of the second storage system. The predetermined input is a designation of an expansion mode that signifies that the second storage system is functioning as an expansion system of the first storage system. The cancellation of the predetermined input is a designation of a mode other than the expansion mode.

An embodiment 11 comprises a first storage system having a first storage device and a first controller, and a second storage system having a second storage device and a second controller. The first storage device comprises a first user area which is a storage area that is accessible to the host and in which data accessed by the host are stored, and a first system area which is a storage area that is inaccessible to the host and in which first system information which is information relating to the constitution and control of the first storage system is stored. The second storage device comprises a second user area which is a storage device that is accessible to the host and in which user data accessed by the host are stored and a second system area which is a storage area that is inaccessible to the host and in which second system information which is information relating to the constitution and control of the second storage system is stored. The first controller and/or second controller reads the system information elements of the first system information from the first storage area and (A) transmits the system information elements or modified system information elements to a computer (management computer or host computer, for example), (B) transmits the system information elements or modified system information elements to the second storage system without passing through a computer (via the first interface device and second interface device, for example) or (C) writes the system information elements or modified system information elements to the second system area.

In case (A), for example, the computer transmits the received system information elements or modified system information elements to the second storage system. The second controller specifies the second system area and writes the system information elements or modified system information elements to the second system area. That is, in case (A), the system information elements or modified system information elements are transferred from the first storage device of the first storage system to the second storage device of the second storage system without passing through a computer. In case (A), at least one of the first controller, second controller, and computer is able to determine whether it is necessary to change the system information elements thus read from the first system area and what kind of system information elements these system information elements are to be changed to on the basis of the state of the second storage system and/or the second system information stored in the second system area.

In case (B), the second controller specifies the second system area and writes the system information elements or modified system information elements to the second system area.

In cases (B) and (C), one of the first and second controllers is able to determine whether it is necessary to change the system information element read from the first system area and what kind of system information element the system information element is changed to based on the state of the second storage system and/or the second system information stored in the second system area.

In this embodiment, one or more third physical ports of at least one of the embodiments 1 to 10 can be referred to as the first interface device and one or more sixth physical ports of at least one of the embodiments 1 to 10 can be called the second interface device. In addition, the first storage system can be the migration source storage system and the second storage system can be the migration destination storage system. Further, in this embodiment, the system I/F 115 according to the subsequent second embodiment can be called the first interface device and the system I/F 215 of the subsequent second embodiment can be referred to as the second interface device.

In an embodiment 12, according to at least one of the embodiments 1 to 11, wherein any of the first controller, second controller, and computer determines whether it is necessary to change the system information elements thus read and to what kind of system information elements these system information elements are to be changed on the basis of the state of the second storage system and/or the second system information stored in the second system area, and transfers the system information elements corresponding with this determination to the second storage system (transfer same without passing through the first interface device and second interface device, for example).

In an embodiment 13, according to at least one of the embodiments 1 to 12, wherein any of the first controller, second controller, and computer reads user data from the first user area based on the first system information and transfers user data to the second storage system via the first interface device on the basis of the second system information including the system information elements thus transferred.

In an embodiment 14, according to the embodiment 13, wherein the system information elements included in the first system information include first identification information relating to the first storage system. The system information elements included in the second system information include second identification information relating to the second storage system. In cases where the system information elements thus read are the first identification information, any of the first controller, second controller, and computer exchanges the second identification information for the first identification information via the first interface device.

In an embodiment 14, according to at least one of the embodiments 13 to 14, wherein any of the first controller, second controller, and computer transmits predetermined types of the system information elements thus read to the second storage system if the predetermined types of the system information elements thus read are newer than a predetermined type of system information of the second system information.

In an embodiment 16, according to at least one of the embodiments 13 to 15, wherein any of the first controller, second controller, and computer changes the system information elements thus read to content that does not duplicate that of the existing system information elements in cases where system information elements that match the system information elements thus read are included in the second system information, and transmits modified system information elements to the second storage system.

In an embodiment 17, according to the embodiment 16, wherein the first storage device is constituted by a plurality of first media drives and the second storage device is constituted by a plurality of second media drives. The system information elements included in the first system information include first drive information that has, for each of the first media drives, a first drive information element relating to the first media drive, first RAID group information that has, for each of the first RAID groups, a first RAID group information element relating to which two or more first media drives the constitution of the first RAID group is based on and/or first LU information that has, for each first LU, a first LU information element relating to a first logical unit (LU) that is formed based on the plurality of first media drives. The system information elements included in the second system information include second drive information that has, for each of the second media drives, a second drive information element relating to the second media drive, second RAID group information that has, for each of the second RAID groups, a second RAID group information element relating to which two or more second media drives the constitution of the second RAID group is based on and/or second LU information that has, for each second LU, a second LU information element relating to a second LU that is formed based on the plurality of second media drives. The first drive information is a non-migration target. Any of the first controller, second controller, and computer changes the first RAID group information and/or first LU information thus read based on the second drive information and transmits the modified first RAID group information and/or first LU information to the second storage system.

In an embodiment 18, the second controller receives system information elements from the first storage system via the second interface device and writes the received system information elements or modified system information elements to the second system area. In this embodiment, one or more third physical ports of at least one of the embodiments 1 to 10 can be called the first interface device and one or more of the sixth physical ports of at least one of the embodiments 1 to 10 can be called the second interface device. In addition, the first storage system can be the migration source storage system and the second storage system can be the migration destination storage system. Furthermore, in this embodiment, the system I/F 115 of the subsequent second embodiment can be referred to as the first interface device and the system I/F 215 of the subsequent second embodiment can be called the second interface device.

In an embodiment 19, according to at least one of the embodiments 1 to 10 and 18, the second controller determines whether it is necessary to change the system information elements thus received and to what kind of system information elements these system information elements are to be changed on the basis of the state of the second storage system and/or the second system information stored in the second system area, and transfers the system information elements corresponding with this determination to the second system area.

In an embodiment 20, according to at least one of the embodiments 1 to 10 and 18 to 19, wherein the second controller receives user data via the second interface device and writes the user data to the second user area based on the second system information including the system information elements thus written.

In an embodiment 21, according to at least one of the embodiments 19 to 20, wherein the second controller exchanges the second identification information with the first identification information via the second interface device in cases where the received system information element is the first identification information.

In an embodiment 21, according to at least one of the embodiments 19 to 21, wherein, if the predetermined type of system information element thus received is newer than the predetermined type of system information of the second system information, the second controller writes the received predetermined type of system information element to the second system area.

In an embodiment 23, according to at least one of the embodiments 19 to 22, wherein, in cases where a system information element that matches a received system information element is already included in the second system information, the second controller changes the received system information element to content that does not duplicate that of the existing system information element and writes the modified system information element to the second system area.

In an embodiment 24, according to at least one of the embodiments 19 to 23, wherein the first drive information is a non-migration target and the second controller changes the received first RAID group information and/or first LU information based on the second drive information and writes the modified first RAID group information and/or first LU information to the second system area.

In an embodiment 25, according to at least one of the embodiments 1 to 24, wherein there is a management device (management computer, for example) that is connected to at least one of the first storage system and the second storage system. The management device comprises a storage resource, an information-gathering section that gathers the first system information and the second system information and stores same in the storage resource, a display section that displays a migration target designation screen which is a screen that accepts a designation of a migration target from the user based on the first and second system information thus gathered, and a migration designation section that transmits a migration designation including information representing the migration target designated by the user to at least one storage system. System information elements are read from the first system area in response to the migration designation.

Two or more optional embodiments of the above plurality of embodiments 1 to 25 can be combined.

A few embodiments of the present invention will now be described in detail with reference to the drawings. The present invention is not limited to these embodiments.

When data in a large-scale storage system and a storage system not requiring maintenance are transferred to a new storage system, data migration is then executed without passing via a host (a so-called backend connection). At such time, not only data but also system information which is information relating to the constitution and control of the storage system can also be transferred.

For example, in the case of a migration source storage system and migration destination storage system, there are also cases where the number of media drives installed and the identifiers allocated to the respective media drives (the drive numbers, for example) differ. Hence, although, conventionally, migration is carried out by manually applying changes to the system information, with this embodiment, system information that corresponds to the constitution of the migration destination storage system as a result of the measures described in detail subsequently is automatically set.

In addition, in cases where data (user data) are already stored in the migration destination storage system, a function for protecting data so that the user data are not overwritten and a function for deleting data from the migration source storage system after transferring all the data from the migration source storage system to the migration destination storage system are provided.

By providing such functions, the work of data migration between the storage systems, that is, the series of operations from the setting of system information of the storage system to data migration followed by the deletion of data from the migration source storage system can be executed with very little burden to the user.

First Embodiment

In this embodiment, it is assumed that the data migration is data migration that is implemented for the sake of replacing a storage system. Therefore, when data migration is performed, the migration destination storage system (the new storage system) is not operating. In addition, the migration source storage system (the storage system that has been used thus far) stops operating once the replacement of the storage system is complete. That is, in this embodiment, the migration source storage system and migration destination storage system do not operate in parallel. 'Operate' as it is used here signifies the fact that the storage system operates in a state where same can receive I/O requests from the host. The migration source storage system will also be called the 'migration source system' hereinbelow. Likewise, the migration destination storage system is also called the 'migration destination system'. The migration destination system and migration source system are also sometimes referred to simply as 'storage systems'.

FIG. 1 shows a constitutional example of storage systems 100 and 200 that comprise a data migration control device according to this embodiment.

The migration source system 100 and migration destination system 200 are connected via a communication cable 500. Although the details will be described subsequently, the connection between the two systems 100 and 200 is made by connecting expanders 114 and 214 that the migration source system 100 and migration destination system 200 comprise respectively to one another by means of communication cable 500. Hence, the communication cable 500 uses an SAS (Serial Attached SCSI) cable that can be connected to expanders 114 and 214, for example.

The migration source system 100 has a management PC 300 connected thereto. The connection between the migration source system 100 and management PC 300 is made via a communication network such as a LAN (Local Area Network), for example.

First, the management PC 300 will be described. The management PC 300 is a device for controlling data migration between the storage systems 100 and 200 and is a computer such as a personal computer, for example. The management PC 300 comprises a CPU, memory, an input section such as a keyboard and mouse and an output section such as a display, for example. In addition, the memory of the management PC 300 stores a migration tool 310 which is a program for controlling the data migration. The migration tool 310 controls at least one of the migration source system 100 and migration destination system 200 as a result of being executed by the CPU of the management PC 300, thereby enabling data migration between the two systems 100 and 200 to be performed. In addition, the migration tool 310 provides the user with a predetermined GUI (Graphical User Interface) so that the user is able to make a variety of data-migration-related settings and receive predetermined inputs from the user. Settable items will be described subsequently but, to cite one example, settings stipulating which user data are to be transferred to and whether the transferred data are to be deleted from the migration source system 100, or the like, are sometimes made. In cases where the computer program is the subject of the description hereinbelow, it is assumed that processing is carried out by the processor (CPU) that actually executes the computer program.

The storage systems 100 and 200 will be described next. Due to the space constraints of the page, the constitution of the migration destination system 200 is partially omitted but the constitution of the migration source system 100 and migration destination system 200 is basically the same. Here, the constitution of the storage systems 100 and 200 will be described by adopting the migration source system 100 as a representative example.

The migration source system 100 incorporates, for example, a duplexed controller device (CTL) 110, a duplexed power source 130, a storage device, a migration switch (SW) 120, and a main SW 150, for example.

The storage device is constituted as an aggregate of a plurality of hard disk drives (HDD) 140, for example. The HDD 140 contains a SATA (Serial Attached SCSI) or SAS interface, for example. In addition, the storage device is not limited to the HDD 140 and may also be constituted by another type of media drive (flash memory drive, for example) or media drives of a plurality of types may be mixed together. If the HDD 140 is a SAS_HDD, the HDD itself has a SAS address but if the HDD 140 is a SATA_HDD, the HDD itself does not have a SAS address. A SATA_HDD is connected to a phy (physical port) of the expander 114 via an interface converter (dongle), for example, but, as the SAS address of the device connected to the phy, a SAS address is allocated to the interface converter connected to the phy. Hence, in cases where a SAS_HDD connected to the phy of the expander 114 is exchanged for another SAS_HDD, the SAS address of the device connected to the phy is also changed. However, when the SATA_HDD connected to the phy is exchanged for another SATA_HDD, the SAS address of the device connected to the phy is not changed.

The CTL 110 is a hardware circuit, for example. The CTL 110 comprises an upper I/F (interface) 111, a RAID control section 112, a SAS controller 113, and a SAS expander (referred to simply as 'expander' hereinbelow) 114. The upper I/F 111, RAID control section 112, SAS controller 113, and expander 114 are connected in series in that order moving from the top to the bottom.

The upper I/F 111 is an interface for a connection with a higher-level device (a host 400, management PC 300, or other storage system, for example). The upper I/F 111 is able to accept a variety of commands (commands requesting the reading or writing of data or commands requesting data migration, or the like) from the higher-level device. The upper I/F 111 that accepts the commands transmits the commands to the RAID control section 112.

The RAID control section 112 is a module that comprises a CPU for executing computer programs and a memory for storing the computer programs, for example, and executes command processing. More specifically, when a command requesting data writing (a write command) is received, for example, the RAID control section 112 issues an instruction to the SAS controller 113 to write the data received together with the write command (the write data) to the HDD 140 specified based on the write command and to an area of the HDD 140. If this is described in more detail, the RAID control section 112 first reads system information from the storage device during startup and stores same in the memory. The RAID control section 112 references the system information and thereby specifies the HDD 140 constituting the address destination and the area thereof from the address designated by the write command (LUN (Logical Unit Number) or LBA (Logical Block Address), for example). The RAID control section 112 issues an instruction to access a specified area of the HDD 140 to the SAS controller 113. After being received by the RAID control section 112, the write data are temporarily stored in the memory of the RAID control section 112 (cache memory, for example) until the write data are written to the HDD 140. In addition, when a command requesting data reading (a read command) is received, the RAID control section 112 issues an instruction to the SAS controller 113 to read the designated data (read data) from a predetermined HDD 140. The RAID control section 112 then transmits the read data thus read from the HDD 140 to the host 400 by controlling the SAS controller 113. After being read from the HDD 140 by the RAID control section 112, the read data are temporarily stored in the memory (cache memory, for example) of the RAID control section 112 until same are transmitted to the host 400. In addition, when a command requesting data migration is received, processing for data migration from the migration source system 100 to the migration destination system 200 (also called 'migration processing' hereinbelow) is implemented. The details of the migration processing will be described subsequently.

The SAS controller 113 is a hardware circuit (IC chip, for example), for example. The SAS controller 113 writes and reads data to and from the HDD 140 in response to instructions from the RAID control section 112.

The expander 114 is one type of switch device. The expander 114 has a plurality of HDD 140 connected thereto. The writing and reading of data that are performed by the SAS controller 113 are executed via the expander 114. In addition, as mentioned earlier, the two systems 100 and 200 are connected as a result of connecting the expander 214 of the migration destination system 200 to the expander 114 of the migration source system 100.

The main SW 150 is a switch for switching the power source of the upper I/F, RAID control section 112, and SAS controller 13 in the CTL 110 ON and OFF (power is transmitted to the expander 114 and HDD 140 irrespective of the state of the main SW 150). The migration SW 120 is a switch for controlling the connection between the migration source system 100 and migration destination system 200. At least one of the main SW 150 and migration SW 120 is a switch of an alternate type in which the result of the switching operation (ON and OFF) is held and, more specifically, a toggle switch or seesaw switch or the like, for example. The mode of the storage system 100 is defined by means of a combination of the ON/OFF state of the main SW 150 and the ON/OFF state of the migration SW 120. The details will be described subsequently.

The storage system was described hereinabove. Incidentally, the storage system of this embodiment is a storage system for which maintenance by the user is not required and for which insertion or removal of the pre-installed HDD 140 is impossible. For example, FIG. 29 provides an external perspective view of the migration source system 100. The migration source system 100 comprises, for example, an enclosure 2, a front bezel 3 that is provided to cover the front side of the enclosure 2 and a plurality of HDD 140 that are disposed in the form of a matrix in the front side of the enclosure 2. The HDD 140 is connected to a back board (not shown) (a circuit substrate). Connected to the rear side inside the enclosure 2 are the CTL 110, which is connected to the back board, a power source 130, a battery (not shown), and a cooling fan (not shown). The front bezel 3 cannot be removed by the user, for example, nor can the HDD 140 be removed by the user, for example. More specifically, for example, the HDD 140 are arranged using a pitch into which a human finger cannot enter. Removal is made impossible as a result of a device whereby the HDD 140 are not provided with a knob of the kind in a canister. The migration source system 100 is provided with a predetermined number of expansion slots (two, for example), for example, and removable HDD can be inserted and removed via the expansion slots. As a result, the number of HDD installed in the migration source system 100 can be increased or reduced.

The constitution of the expanders 114 and 214 will be described in detail next. The constitution of the expanders 114 and 214 is substantially the same and will therefore be described here by taking the expander 214 of the migration destination system as a representative example.

Figure 23:
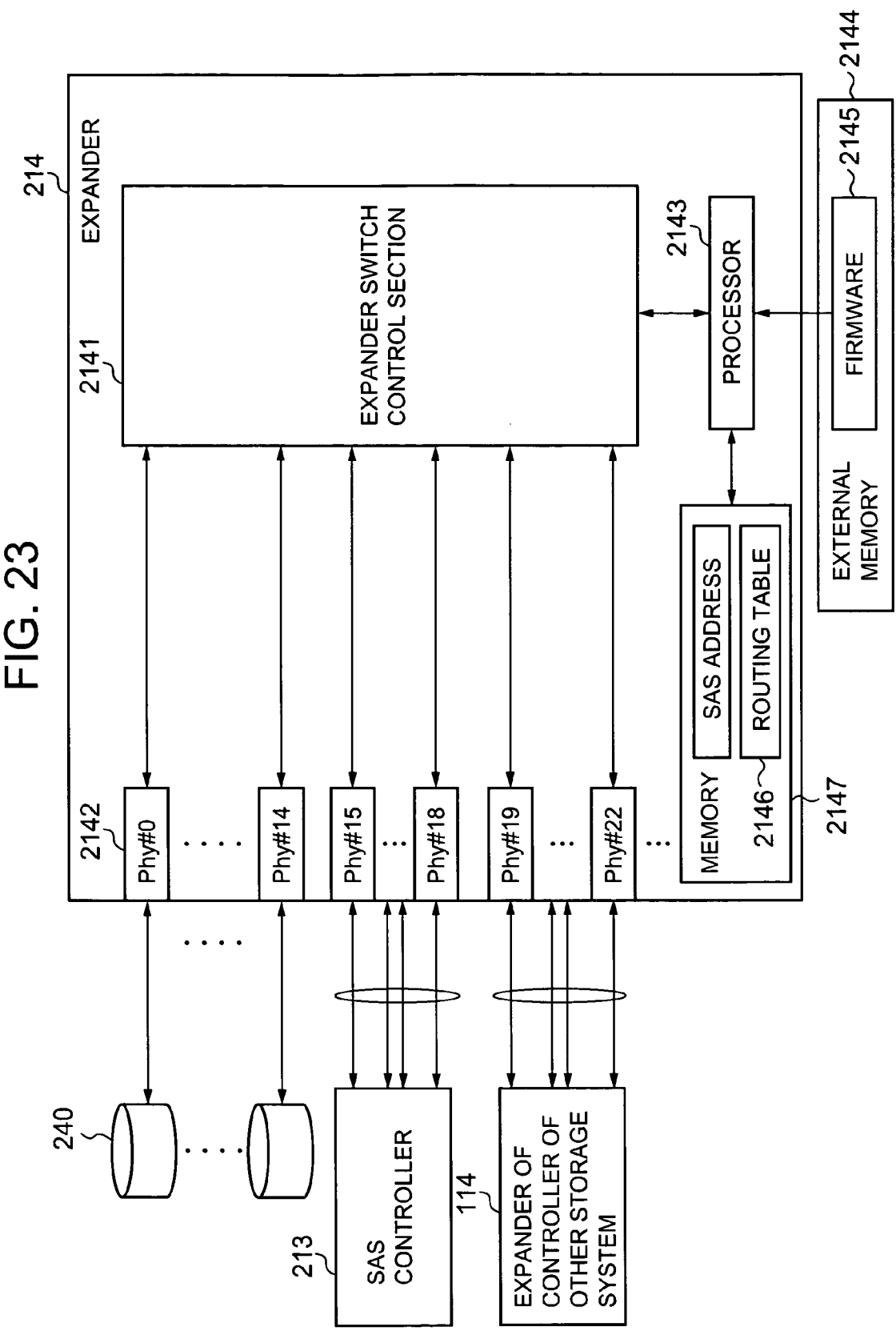
FIG. 23 shows a constitutional example of an expander.

FIG. 23 shows a constitutional example of the expander 214 of the migration destination system.

The expander 214 is an LSI (Large Scale Integration), for example. The expander 214 comprises a plurality of phy 2142, an expander switch control section 2141, a processor (a CPU, for example) 2143, and a memory 2147. In addition, the expander 214 has an external memory 2144 connected thereto.

The external memory 2144 stores computer programs that are executed after being loaded into the processor 2143. The computer programs are firmware 2145, for example.

The phy 2142 are physical ports. A variety of devices can be physically connected to the phy 2142.

For example, in this embodiment, HDD 240 (for example, a predetermined number thereof (two, for example) may also be removable HDD which can be inserted or removed by the user via expansion slots (not shown)) are connected to a certain one or more (fifteen, for example) phy 2142 (Phy #0 to Phy #14) among a plurality of phy 2142.

In addition, a SAS controller 213 of the migration destination system 200 is connected using a wide link, for example, to a certain one or more (four, for example) phy 2142 (Phy #15 to Phy #18) of the plurality of phy 2142, for example. These four phy 2142 (Phy #15 to Phy #18) are sometimes referred to as 'SAS controller connection ports' hereinbelow.

In addition, the expander 114 of the other storage system (the migration destination system 200) is connected using a wide link, for example, to a certain other one or more (four, for example) phy 2142 (Phy #19 to Phy #22) of the plurality of phy 2142. These four phy 2142 (Phy #19 to Phy #22) are physical ports via which system information and user data pass during the migration of the system information and user data. These four phy 2142 (Phy #19 to Phy #22) are sometimes referred to hereinbelow as 'dedicated data migration ports'.

The expander switch control section 2141 is a hardware circuit that performs SAS I/F control or switch control. The expander switch control section 2141 has a plurality of phy 2142 and the processor 2143 connected thereto. The switch control by the expander switch control section 2141 is carried out on the basis of a routing table 2146.

The memory 2147 stores the SAS address of the expander 214 (address according to SAS rules) and the routing table 2146. The routing table 2146 records the respective devices that exist under the expander 214 having the table 2146 as well as information elements that represent the destination for each device that is directly connected to the phy 2142 of the expander 214 (destination information elements).

More specifically, the routing table 2146 records, for example, a phy number, phy state, phy attribute, and SAS address for each phy 2142, as shown in FIG. 24.

The states of phy include, for example, enable and disable. If the phy states of the two physical ports which are physically connected to one another are both enable, the physical ports are logically connected to one another but if the phy state of at least one physical port is disable, the physical ports are not logically connected to one another. In addition, if the phy states of phy to which devices that are different from the other phy are connected are enable, a logical connection between the phy and devices is possible and, if the phy states are disable, a logical connection between the phy and devices is impossible.

phy attributes include, for example, the two types "Table" and "Subtractive". As shown in FIG. 27C, depending on the relationship between the phy attribute of the dedicated data migration port of the upstream expander and the phy attribute of the dedicated data migration port of the downstream expander, access from upstream to downstream is either possible or impossible. More specifically, for example, in cases where the phy attribute of the two dedicated data migration ports is "Table" or where the phy attribute of the dedicated data migration port of the downstream expander is "Table" and the phy attribute of the dedicated data migration port of the upstream expander is "Subtractive", access from upstream to downstream is impossible but, in cases where the phy attribute of the dedicated data migration port of the downstream expander is "Subtractive" and the phy attribute of the dedicated data migration port of the upstream expander is "Table", and cases where both the phy attributes are "Subtractive", access from upstream to downstream is possible.

The modes of the storage system will be described next by using FIGS. 27A and 27B by taking the migration destination system 200 as an example.

As shown in FIG. 27A, the plurality of modes that can be executed by the migration destination system include modes of three types, namely, normal mode (CTL_ON mode), CTL_OFF mode, and enclosure expansion mode.

Figure 22A:
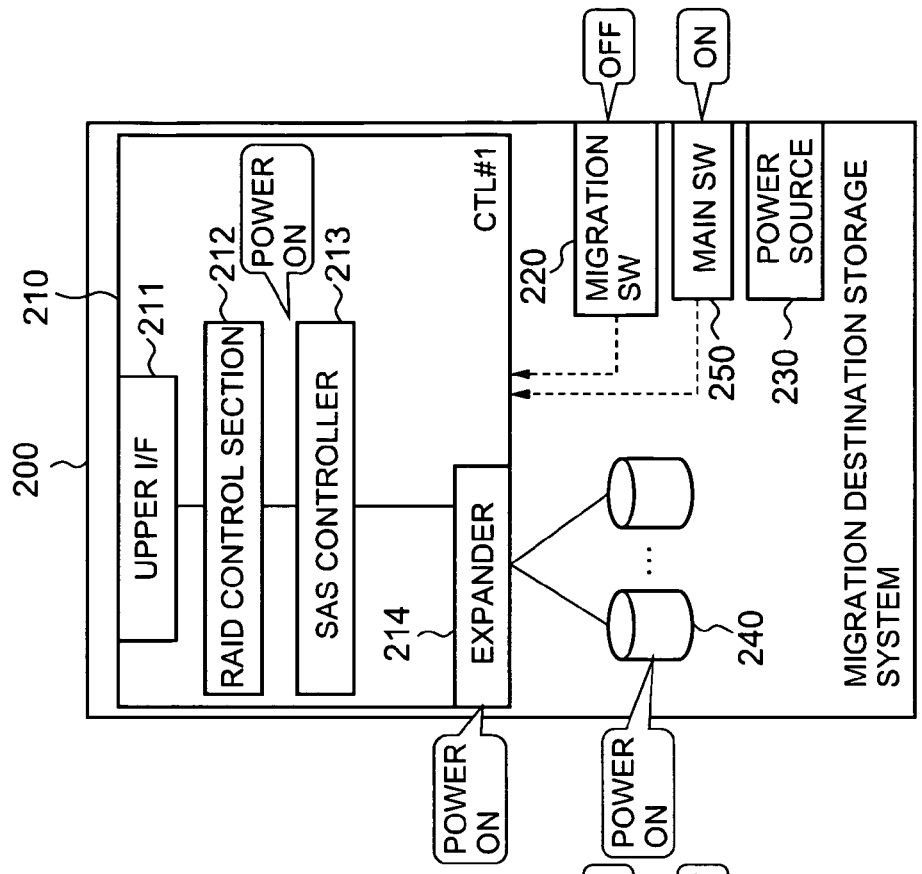
FIG. 22A shows the state of a migration destination system in a CTL_OFF mode.
Figure 22B:
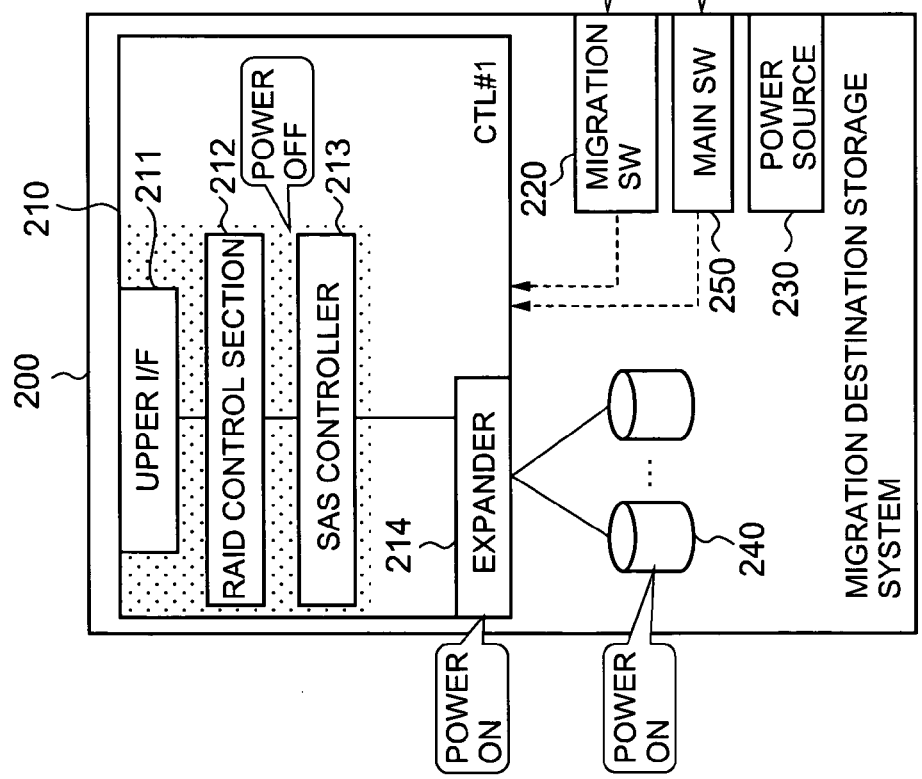
FIG. 22B shows the state of a migration destination system in a normal mode.

Normal mode is a mode that is defined as a result of the main SW 250 being ON and the migration SW 220 being OFF. In normal mode, as shown in FIG. 22B, the power sources of the upper I/F 211, RAID control section 212, and SAS controller 213 are ON. In addition, in normal mode, in accordance with the firmware 2145 of the expander 214, the phy state of the dedicated data migration port is disable, the phy state of the SAS controller connection port is enable, the SAS address of the expander 214 is the default address (an address that is set in accordance with a predetermined rule) and the phy attribute of the dedicated data migration port is "table".

The CTL_OFF mode is a mode that is defined as a result of the main SW 250 being OFF irrespective of the state of the migration SW 220. In CTL_OFF mode, the main SW 250 is OFF and, therefore, as shown in FIG. 22A, the power sources of the upper I/F 211, RAID control section 212, and SAS controller 213 are OFF. In addition, although not illustrated, in CTL_OFF mode, the SAS address of the expander 214 is the default address.

The enclosure expansion mode is a mode that is defined as a result of the main SW 250 being ON and the migration SW 220 being ON. In enclosure expansion mode, the main SW 250 is ON and, therefore, the power sources of the upper I/F 211, the RAID control section 212, and the SAS controller 213 are ON. In addition, in enclosure expansion mode, in accordance with the firmware 2145 of the expander 214, the phy state of the dedicated data migration port is enable and the phy state of the SAS controller connection port is disable, the SAS address of the expander 214 is an address different from the default address, and the phy attribute of the dedicated data migration port is "subtractive".

Figure 25:
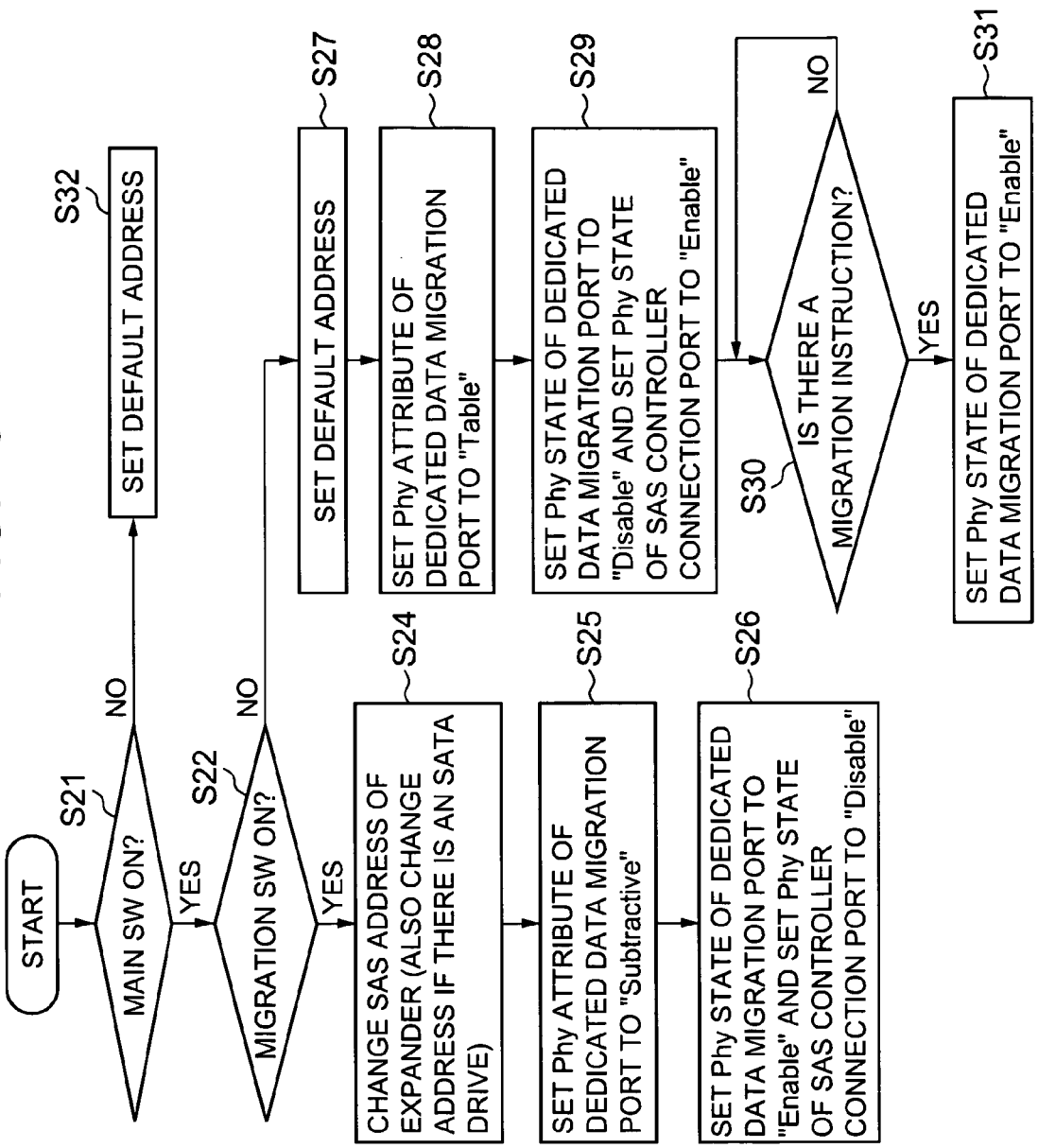
FIG. 25 shows the flow of processing that is performed by the firmware of the expander.

FIG. 25 shows the flow of processing that is executed by the firmware 2145.

This processing is started in response to the ON/OFF switching of the migration SW 220 and main SW 250, for example.

The firmware 2145 sets the SAS address of the expander 214 to the default address in cases where the main SW 250 is OFF (S21: NO), in other words, when the mode is the CTL_OFF mode (S32).

The firmware 2145 performs the following processing incases where the main SW 250 is ON and the migration SW 220 is OFF (S21: YES, S22: NO), in other words, in cases where the mode is normal mode. That is, the firmware 2145 sets the SAS address of the expander 214 to the default address (S27), sets the phy state of the dedicated data migration port to "table" (S28), sets the phy state of the dedicated data migration port to "disable", and the phy state of the SAS controller connection port enable (S29). Thereafter, the firmware 2145 changes the phy state of the dedicated data migration port from disable to enable (S31) when a predetermined instruction is received (S30: YES). The predetermined instruction may, for example, be a migration instruction for data migration or an identification instruction to identify the HDD in the storage system of the enclosure expansion mode.

The firmware 2145 performs the following processing in cases where the main SW 250 is ON and the migration SW 220 is ON (S21: YES, S22: YES), in other words, the enclosure expansion mode. That is, the firmware 2145 changes the SAS address of the expander 214 connected to the expander 214 to an address that is different from the default address (S24), makes the phy attribute of the data migration port "subtractive" (S25), makes the phy attribute of the dedicated data migration port enable, and sets the phy state of the SAS controller connection port to disable (S26).

The address change is performed in S24 for the following reasons.

In each of the storage systems 100 and 200, an SAS address is sometimes assigned to the expanders 114 and 214 in accordance with a predetermined rule, for example. In addition, in cases where the HDD 140 and 240 connected to the expanders 114 and 214 are SATA_HDD, because this does not mean that the SATA_HDD itself has an SAS address as mentioned earlier, an SAS address is sometimes assigned to the phy to which the SATA_HDD is connected in accordance with a predetermined rule. Hence, there is the risk of a conflict between the SAS addresses of the expander 114 and of the phy thereof in the migration source system 100 and the SAS addresses of the expander 214 and the phy thereof in the migration destination system 200. In cases where the storage systems 100 and 200 are connected and the migration destination system 200 is in enclosure expansion mode, for example, the SAS controller 113 of the migration source system 100 acquires the SAS addresses of the expander 214 and HDD 240 of the migration destination system 200 in addition to the SAS addresses of the expander 114 and HDD 140 of the migration source system 100. However, in cases where there are conflicting SAS addresses, an error caused by the address conflict will occur. In order to avoid this error, an address change such as that in S24 is made. Further, in S24, if there is a SATA_HDD among the HDD 240 connected to the expander 214 (if this is detected by referencing the routing table 2146, for example), the firmware 2145 also changes the SAS address for the phy to which the SATA_HDD is connected to another SAS address.

Figure 2:
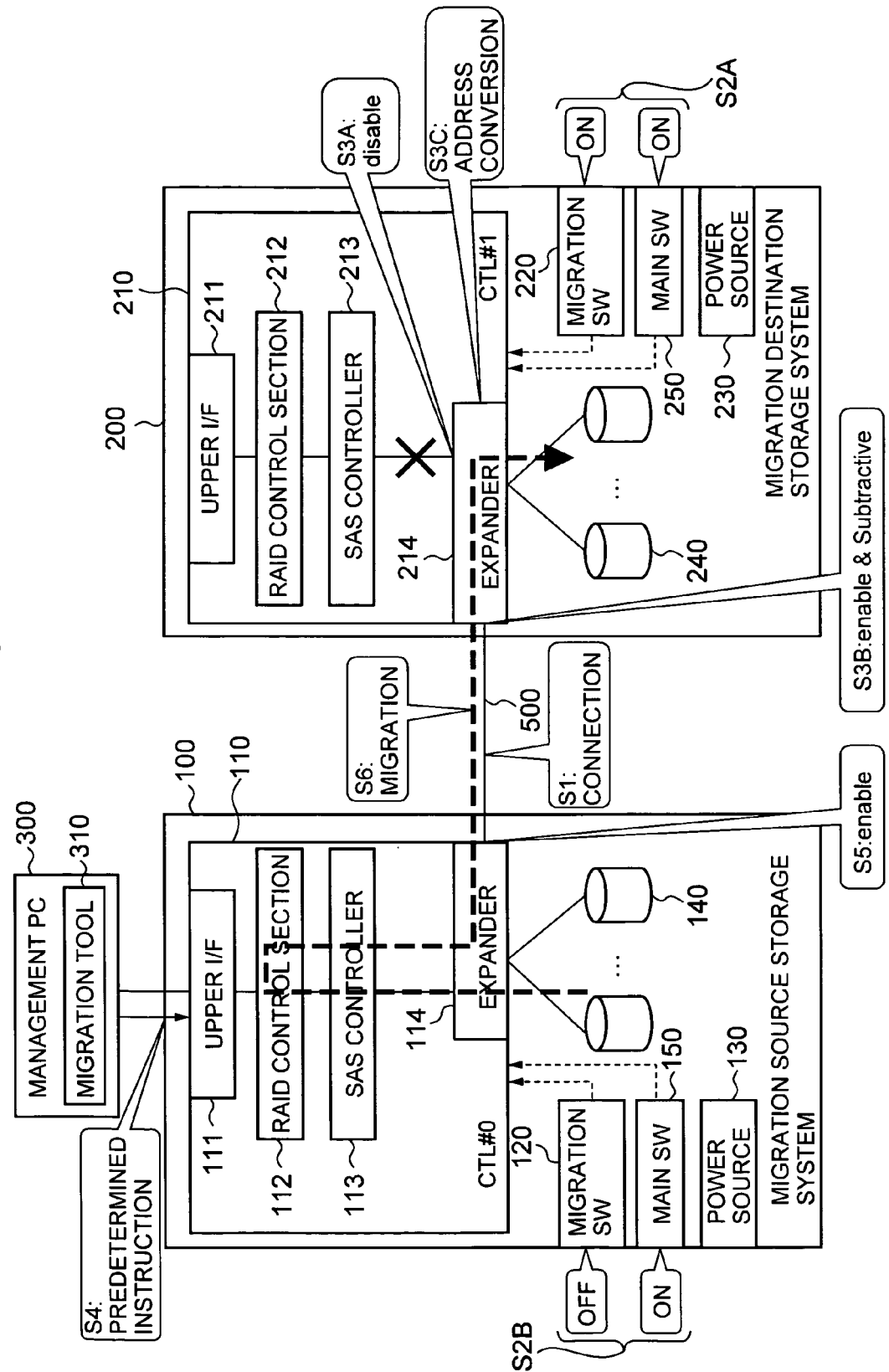
FIG. 2 is an explanatory diagram which provides an overview of the procedure for data migration from a migration source system to a migration destination system.

FIG. 2 provides an overview of the procedure for data migration from the migration source system 100 to the migration destination system 200.

Normally, the expanders 114 and 214 are identified by one SAS controller 113, 213 that is located on a higher level. In cases where the expanders 114 and 214 are not connected by a normal cable 500, the expander 114 of the migration source system 100 is identified by the SAS controller 113 and the expander 214 of the migration destination system 200 is identified by the SAS controller 213. The SAS controllers 113 and 213 are able to access the HDD 140 and 240 via the expanders 114 and 214 that have been identified and to which the HDD 140 and 240 are connected.

Here, the connection between the two systems 100 and 200 is made a result of the expanders 114 and 214 being connected by a communication cable 500 as mentioned hereinabove (S1). Hence, if the two systems 100 and 200 are connected, two SAS controllers 113 and 213 are located above the expanders 114 and 214 respectively. Because there is a control conflict between the two SAS controllers 113 and 213 with respect to the one expander 114 and 214 in this state, the storage systems 100 and 200 do not operate normally.

Therefore, the main SW 150 and 250 and migration SW 120 and 220 are utilized. More specifically, data migration from the migration source system 100 to the migration destination system 200 is made possible by placing one of the migration source system 100 and migration destination system 200 in normal mode and the other in enclosure expansion mode. Although there is a risk of the processing for data migration becoming complex while the RAID control sections 112 and 212 and SAS controllers 113 and 213 of the two storage systems are still operating (an exchange of the RAID control sections 112 and 212 is required, for example), according to this embodiment, when the enclosure expansion mode is in place, the logical connection between the expander 214 and SAS controller 213 is broken and, therefore, this problem can be resolved.

More specifically, in cases where the migration source system 100 is in normal mode and the migration destination system 200 is in enclosure expansion mode, for example, the main SW 150 is ON but the migration SW 120 is OFF in the migration source system 100 (S2B) whereas, in the migration destination system 200, the main SW 250 and migration SW 220 are ON (S2A) as shown in FIG. 2. The order S1, S2A, and S2B is used here but any order may be used.

When the expander 214 of the migration destination system 200 (firmware 2145) detects the enclosure expansion mode (main SW 250: ON, migration SW 220: ON), the logical connection between the SAS controller 213 and expander 214 is broken as a result of making the phy state of the SAS controller connection port disable (S3A). In addition, the expander 214 enables the phy state of the dedicated data migration port and makes the phy attribute thereof "subtractive" (S3B). In addition, the expander 214 converts the SAS address of the expander 214 to an address that is different from the default address (also converts the address if there is a SATA_HDD) (S3C). The order S3A, S3B, and S3C was used for the above process flow but any order is possible.

The migration tool 310 transmits a predetermined instruction to the migration source system 100 (S4). The RAID control section 112 receives the predetermined instruction and transmits the predetermined instruction to the expander 114 via the SAS controller 113. The expander 114 sets the phy state of the dedicated data migration port of the expander 114 to enable in response to the predetermined instruction (S5). In normal mode, the phy attribute of the dedicated data migration port of the expander 114 is "table". Therefore, a logical connection between the dedicated data migration port of the expander 114 and the dedicated data migration port of the expander 214 is possible in accordance with the above serial process flow.

In this case, the SAS controller 113 is able to acquire the respective SAS addresses of the expander 114, of all of the HDD 140 connected thereto, of the expander 214, and of all the HDD 240 connected thereto and register the SAS addresses thus acquired as well as device information relating to the devices corresponding with the SAS addresses in an address map (information that is saved in the memory (not illustrated) of the SAS controller 113, for example) 1141 that is illustrated in FIG. 30, for example. Thereafter, the SAS controller 113 is able to access the HDD 240 in the migration destination storage system 200 on the basis of the address map 1141.

The RAID control section 112 performs data migration of user data and system information in response to the migration instruction from the migration tool 310 (S6). More specifically, the RAID control section 112 reads the user data and system information from the HDD 140 and writes the user data and system information thus read to the HDD 240 of the migration destination system 200 via the dedicated data migration port of the expander 114 and the dedicated data migration port of the expander 214.

As mentioned earlier, by connecting the two systems 100 and 200 by connecting the expanders 114 and 214, the RAID control section 112 of the migration source system 100 is able to access the HDD 240 of the migration destination system 200 in the same way the RAID control section 112 accesses the HDD 140. Hence, data migration can be performed at high speed in comparison with a case where data migration is performed via the host 400.

Figure 26:
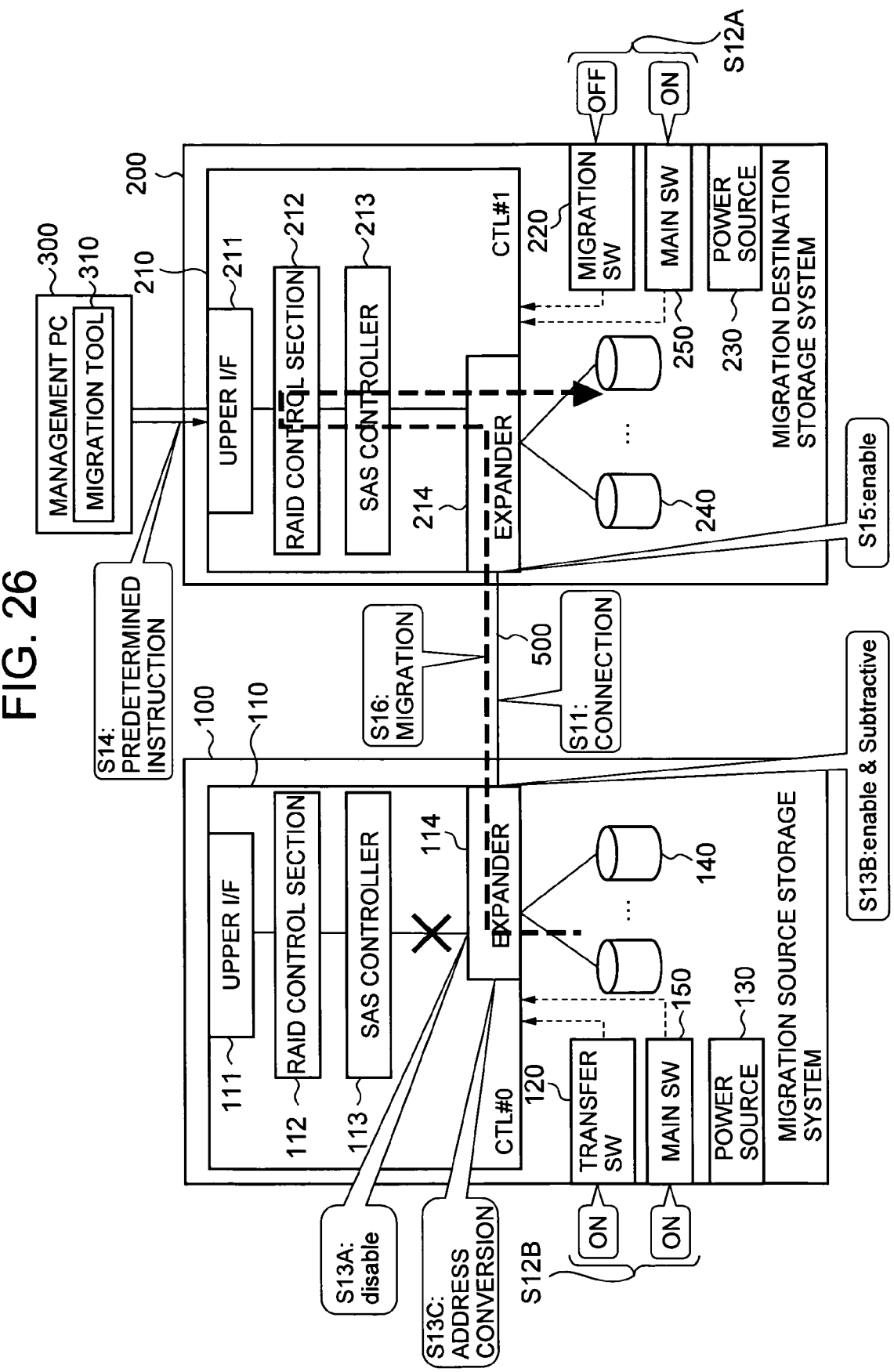
FIG. 26 is an explanatory diagram that provides an overview of another procedure of data migration from the migration source system to the migration destination system.

Further, in this embodiment, as shown in FIG. 26, data migration in which the migration source system 100 is placed in enclosure expansion mode and the migration destination system 200 is placed in normal mode is also possible. More specifically, the dedicated data migration ports can be connected using a cable 500 (S11) and, in the migration source system 100, the main SW 150 and migration SW 120 are ON (S12B), whereas, in the migration destination system 200, the main SW 250 is ON and the migration SW 220 is turned OFF (S12A). The order S11, S12A, and S12B is used here but any order may be used.

When the expander 114 of the migration source system 100 detects the enclosure expansion mode (main SW 150: ON, migration SW 120: ON), the logical connection between the SAS controller 113 and expander 114 is broken by setting the phy state of the SAS controller connection port to disable (S13A). Further, the expander 114 sets the phy state of the dedicated data migration port to enable and the phy attribute thereof to "subtractive" (S13B). In addition, the expander 114 converts the SAS address of the expander 114 to an address that is different from the default address (also converts the address if there is a SATA_HDD) (S13C). The order is S13A, S13B, S13C here but any order may be used.

The migration tool 310 transmits a predetermined instruction to the migration destination system 200 (S14). The RAID control section 212 receives the predetermined instruction and transmits the migration instruction to the expander 214 via the SAS controller 213. The expander 214 sets the phy state of the dedicated data migration port of the expander 214 to enable in response to the predetermined instruction (S15).

The RAID control section 212 performs data migration of user data and system information in response to the migration instruction from the migration tool 310 (S16). More specifically, the RAID control section 212 reads user data and system information from the HDD 140 of the migration source system 100 via the dedicated data migration port of the expander 114 and the dedicated data migration port of the expander 214 and writes the user data and system information thus read to the HDD 240.

As described hereinabove data migration can also be carried out with either the migration source system 100 or the migration destination system 200 as the subject. In the following description, a case where data migration is performed with the migration source system 100 as the subject will be adopted as an example and described.

In addition, as mentioned earlier, the two dedicated data migration ports of the migration source system 100 and migration destination system 200 are initially disable and are not enabled unless normal mode is in place and the predetermined instruction is received. Accordingly, the danger of another storage system being affected by an erroneous operation that is performed on one storage system can be reduced. The risk of existing user data being lost in the migration destination system 200 as a result of an erroneous operation can be reduced by the following measures. Put simply, in cases where a log to the effect that access to the migration destination system 200 or migration destination LU has occurred even once remains in the migration destination system 200, data migration is not performed unless the migration destination LU is formatted, for example. Alternatively, the migration tool 310 does not allow the user to select the defined migration destination LU, for example.

In addition, according to this embodiment, in cases where the two storage systems 100 and 200 are in normal mode or CTL_OFF mode, the SAS addresses of the expanders 114 and 214 of the two storage systems 100 and 200 are the default addresses. For example, in cases where one storage system 200 is in the enclosure expansion mode and is converted to normal mode by mistake, the SAS addresses of the expander 214 is the default address. Hence, as shown in FIG. 28, in cases where an address conflict error such as where the respective SAS addresses of the expanders 114 and 214 are the same occurs, data migration is no longer performed.

In addition, in this embodiment, in cases where a storage system which is in enclosure expansion mode during link-up (while data migration is in progress) receives an instruction to return to normal mode (when the migration SW is switched from ON to OFF during data migration, for example), because normal mode is then assumed, the expander in the storage system restores the address of the expander to the default address. Accordingly, as illustrated in FIG. 28, because a conflict between the SAS addresses of the expanders arises, data migration fails.

The storage device provided in the migration source system 100 is adopted as an example hereinbelow and the constitution of the storage device of the storage system will be described.

Figure 3:
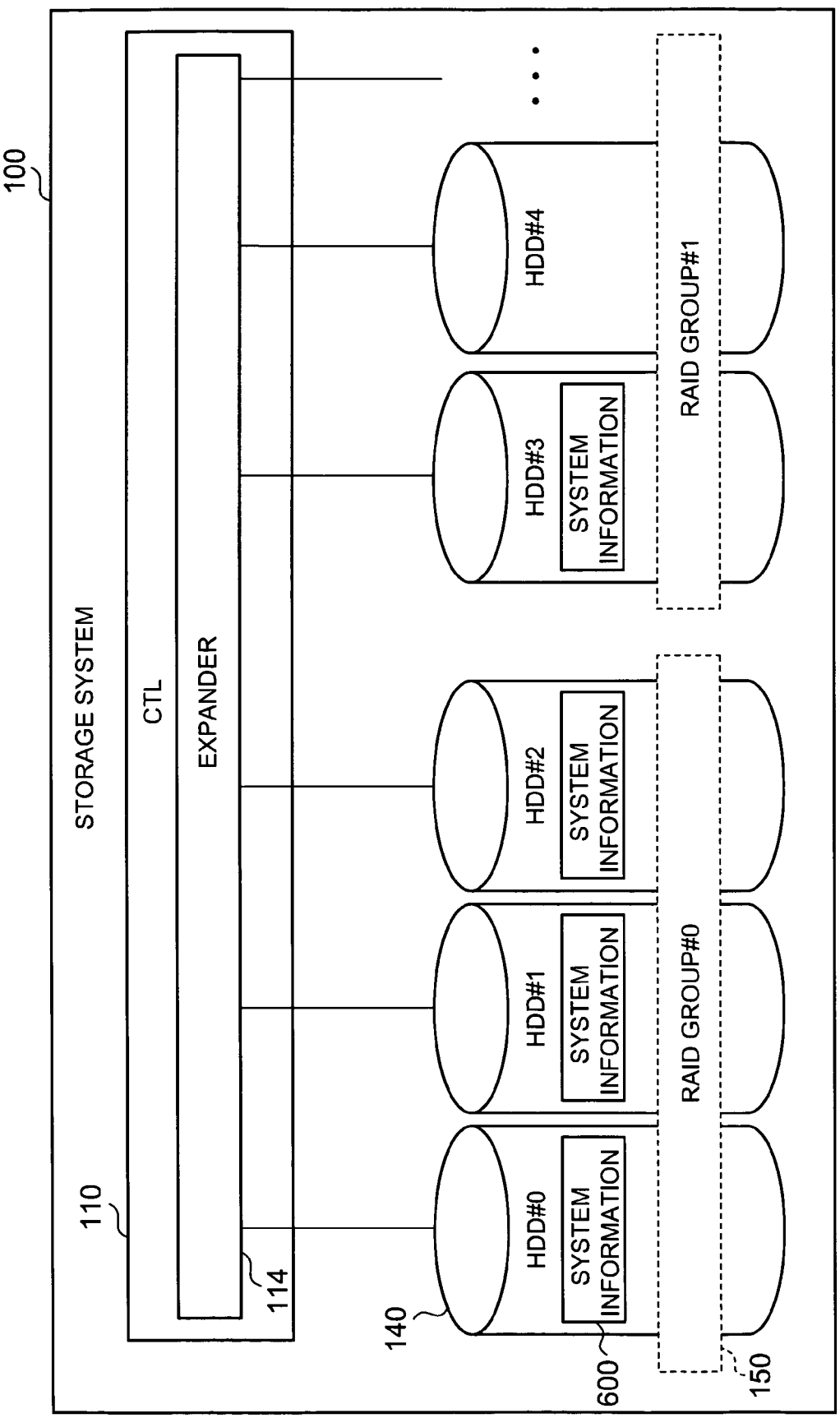
FIG. 3 is a constitutional view of a storage device that the migration source system according to this embodiment comprises.

FIG. 3 is a constitutional example of the storage device that the migration source system 100 according to this embodiment comprises. The migration destination system 200 also has basically the same constitution.

In this embodiment, as illustrated in FIG. 3, the storage device is constituted by a plurality of HDD 140. System information 600 is stored in partial areas of some of the HDD 140. Here, the system information 600 refers to information relating to the constitution or control of the storage systems 100 and 200. For example, the system information 600 includes information representing the physical or logical constitution of the storage systems 100 and 200, the system-specific set values assigned to the storage systems, the system-specific functions that can be executed by the storage systems, or the hosts accessed, and so forth. The system information 600 is stored in areas other than the areas which are supplied to the host 400 (user areas). The details of the system information 600 will be described subsequently. However, the user data which are data accessed by the host 400 are stored in the user areas.

In addition, a RAID group (sometimes also abbreviated to 'RG') 150 is constituted by a plurality of HDD 140. Although not illustrated, the LU identified by the host 400 is formed as a result of assigning predetermined areas contained in the RAID group 150.

Figure 4:
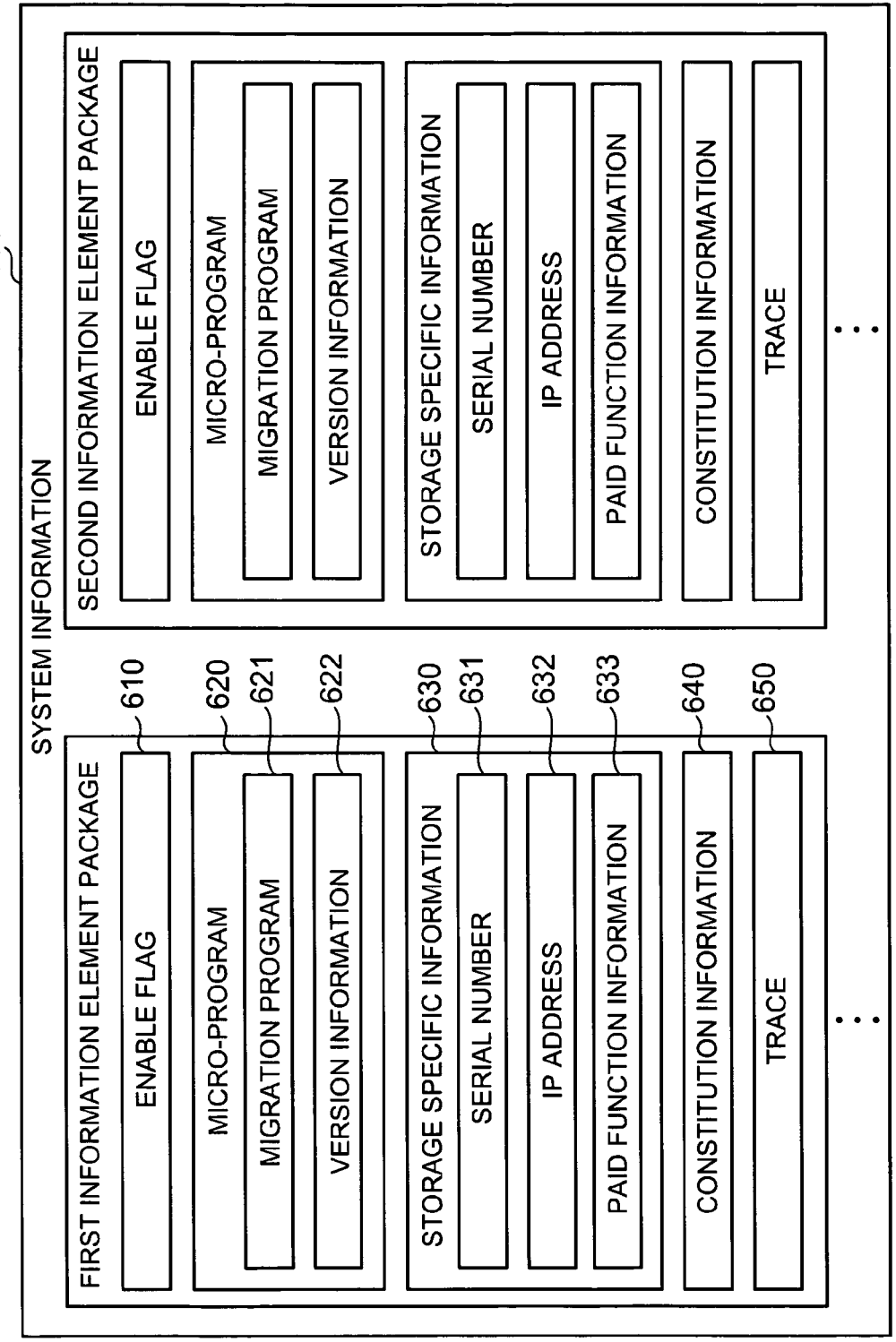
FIG. 4 shows a constitutional example of system information according to this embodiment.

FIG. 4 shows a constitutional example of the system information 600 according to this embodiment.

The system information 600 is constituted by two information element packages, for example, as shown in FIG. 4 and the information element packages each include the same information. In cases where the system information 600 is constituted by two information element packages in this way, either information element package is enabled by means of an enable flag 610 (described subsequently) and only the enable information element package is referenced.

The respective information element packages of the system information 400 include, for example, an enable flag 610, a micro-program 620, storage-specific information 630, constitutional information 640, and trace 650, and so forth.

The enable flag 610 is information indicating which information element package the system information 600 is read from. For example, in cases where the enable flag 610 of the first information element package is set to 'ON' and the enable flag 610 of the second information element package is set to 'OFF', the system information 600 is read from the first information element package.

The micro-program 620 is a program that controls the operation of the storage systems 100 and 200. The micro-program 620 includes a migration program 621 as a sub-program thereof. The migration program 621 is loaded to the memory of the RAID control section 112 and, as a result of being executed by the CPU of the RAID control section 112, migration processing is executed. In addition, the migration program 621 includes version information 622 indicating the version.

The storage-specific information 630 includes a serial number 631, an IP address 632, and paid function information 633, and so forth. The serial number 631 is a product number that is assigned to the storage systems 100 and 200 themselves. The IP address 632 is the IP address that is assigned to the storage systems 100 and 200. The IP address 632 is utilized for a connection with the host 400 or the like. The paid function information 633 is information indicating the paid functions that can be utilized by the storage systems 100 and 200 (that is, the functions that only the user paying the usage fees can utilize). For example, in cases where a few paid functions are pre-installed regardless of whether these functions can be utilized, the paid function information 633 can be a flag indicating whether all the pre-installed paid functions can be utilized. In addition, in cases where only the paid functions that can be utilized are installed, the paid function information 633 can be information indicating what the installed paid functions are. The latter case is assumed in this embodiment.

The constitution information 640 is information defining the physical and logical constitution of the storage systems 100 and 200 and the hosts accessed, and so forth. The constitution information 640 will now be described with reference to FIGS. 5 and 6.

The trace 650 is fault information for when a fault occurs with the storage systems 100 and 200. The trace 650 is used to analyze the cause of the fault that has occurred.

Figure 5:
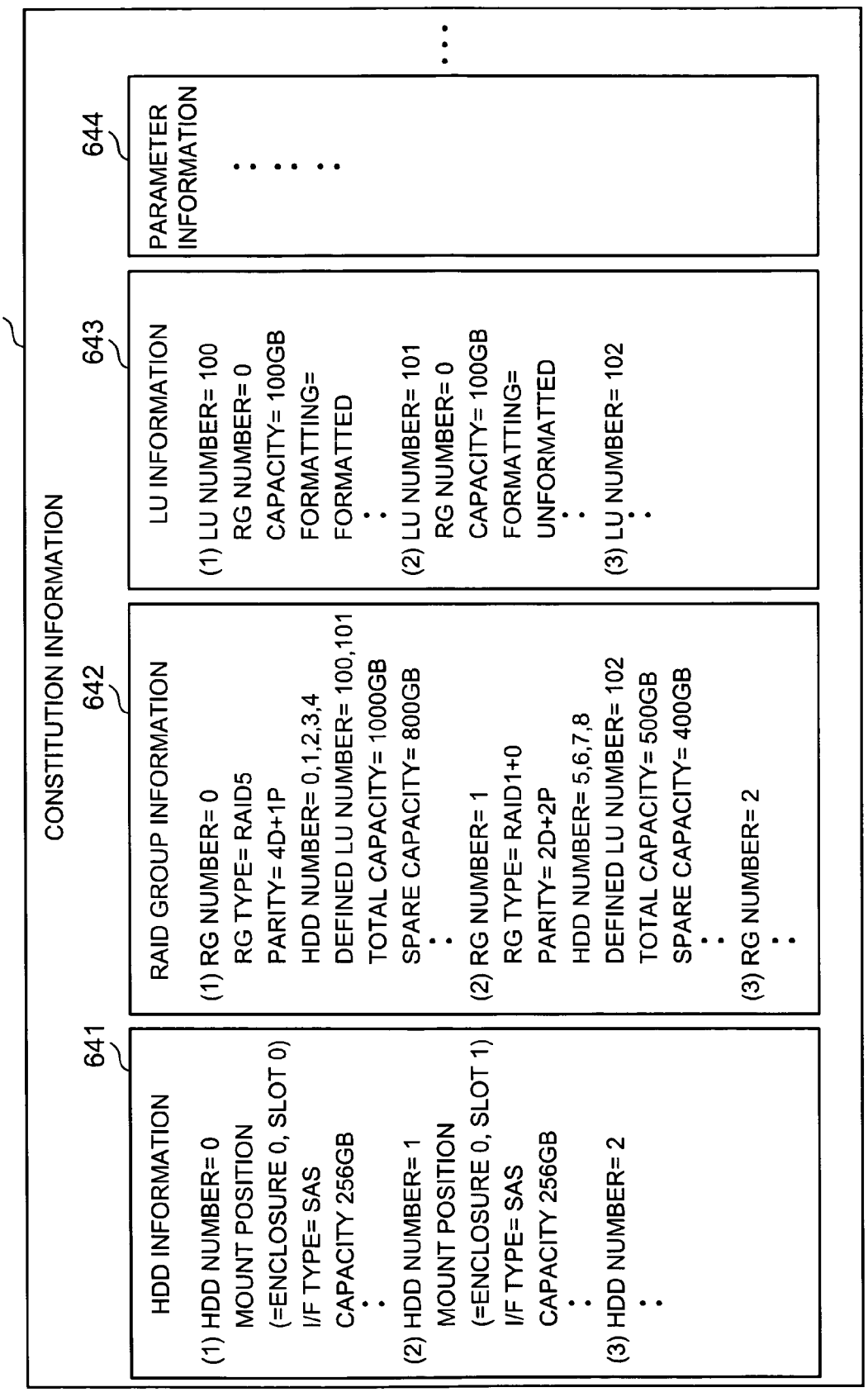
FIG. 5 shows an example of constitutional information according to this embodiment.

FIG. 5 shows an example of constitutional information 640 according to this embodiment.

The constitutional information 640 includes, for example, HDD information 641, RAID group information 642, LU information 643, and parameter information 644, and so forth.

The HDD information 641 is information indicating physical constitution of the storage devices of the storage systems 100 and 200 (also referred to as 'storage device constitution' hereinbelow). For the physical constitution of the storage device, for example, if the storage device is the HDD 140, the number of HDD 140 as well as the disposition and capacity thereof are considered. In the case of FIG. 5, three HDD 140 are provided and the HDD 140 with the HDD number '0', for example, which is one of these HDD 140, is installed in the slot with the slot number '0' in the enclosure with the enclosure number '0' has an interface 'SAS' and a capacity of '256 GB'.

The RAID group information 642 is information that defines the constitution of the RAID group 150. The RAID group information 642 includes the HDD numbers representing the HDD 140 that constitute the RAID group 150, and the total capacity of the user areas provided by the RAID group 150, and so forth. The total capacity of the user areas can be determined as follows. That is, the RAID group 150 with the RG number '0' in FIG. 5 is constituted by five HDD 140 with the HDD numbers '0, 1, 2, 3, 4'. Further, the capacity of the respective HDD 140 is '256 GB' as can be seen from the HDD information 641. In addition, with the RAID group 150 that has a combination (the 'parity' in FIG. 5) of data written to the one stripe area being '4D+1P', the capacity corresponding to four HDD 140 is assigned as a user area. Hence, the total capacity of the user area in the RAID group 150 is '1000 GB' (actually '1024 GB'), which is four times 256 GB. In cases where the system information 600 is stored in the HDD 140 constituting the RAID group 150, the size of the system information 600 is subtracted from the total capacity. Because the total capacity of the RAID group 150 is then '800 GB', it can be seen that an area corresponding to 200 GB obtained by subtracting 800 GB from 1000 GB is being used. The capacity of the area being used is also called the 'usage capacity'.

The LU information 643 is information defining the LU constitution. The LU information 643 includes the RG number or the like indicating the RAID group 150 in which the LU is formed.

The parameter information 644 is information relating to the host 400 connected to the storage systems 100 and 200. The parameter information 644 will be described with reference to FIG. 6.

Figure 6:
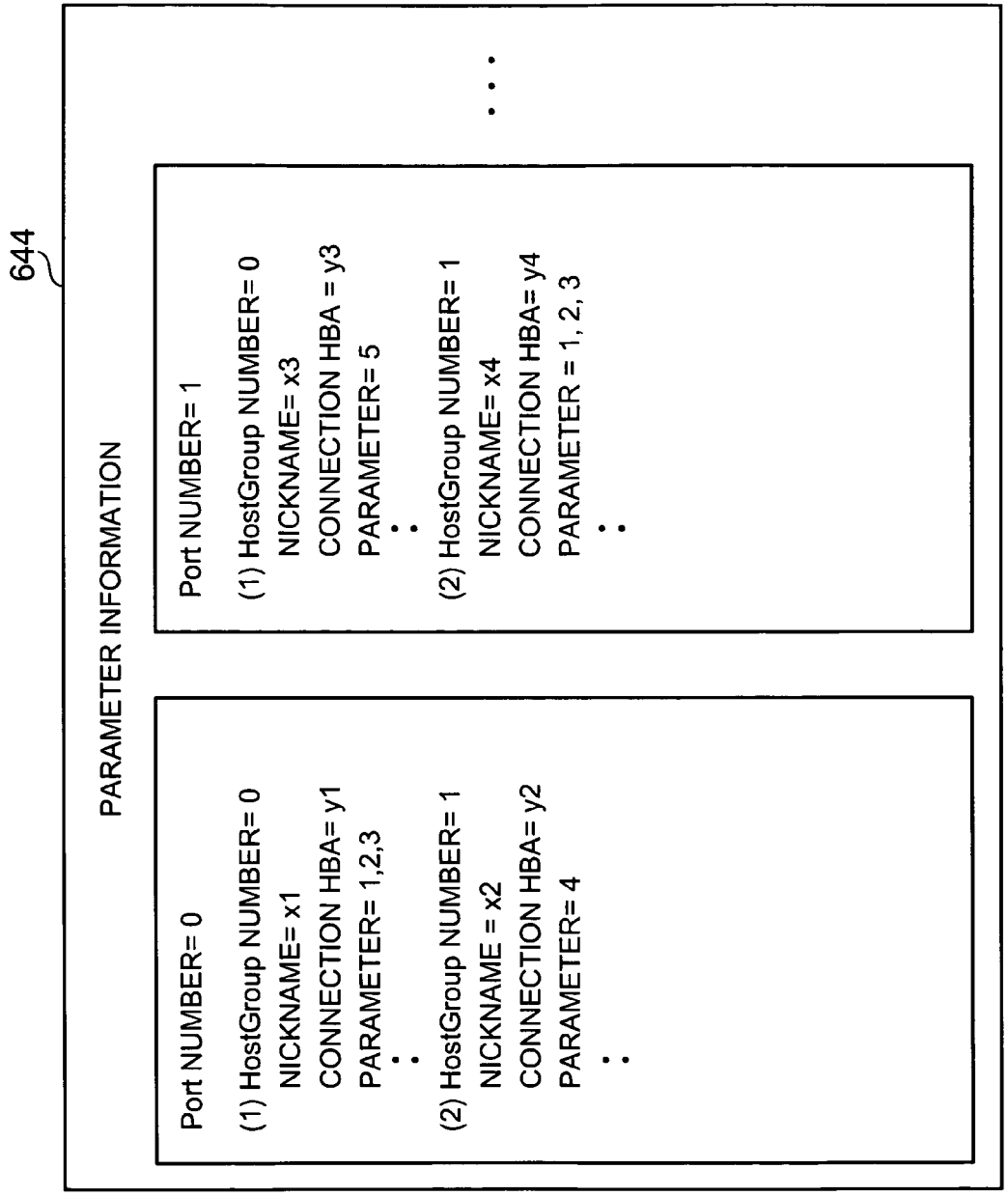
FIG. 6 shows an example of parameter information according to this embodiment.

FIG. 6 shows an example of parameter information 644 according to this embodiment.

As shown in FIG. 6, the parameter information 644 includes information defining the host group associated with the port for each port provided in the upper I/F 111. For example, in FIG. 6, the storage systems 100 and 200 have a port with a port number '0' and a port with a port number '1' and it can be seen that a host group with host group number '0' and a host group with the host group number '1' are defined for the port with port number '0'. Further, it can also be seen that the nickname for the host group with host group number '0' is 'x1' and the HBA connected thereto is 'y1'.

The constitution of the storage systems 100 and 200 of this embodiment was described hereinabove. In the data migration of this embodiment, the system information 600 is transferred in addition to user data. The migration of user data is carried out by copying the user data stored in the HDD 140 of the migration source system 100 to predetermined HDD 240 of the migration destination system 200. However, in cases where system information 600 is transferred, the migration destination system 200 sometimes does not work properly if the system information 600 of the migration source system 100 is simply copied to the migration destination system 200. The migration method of the system information 600 will be described hereinbelow.

Figure 7:
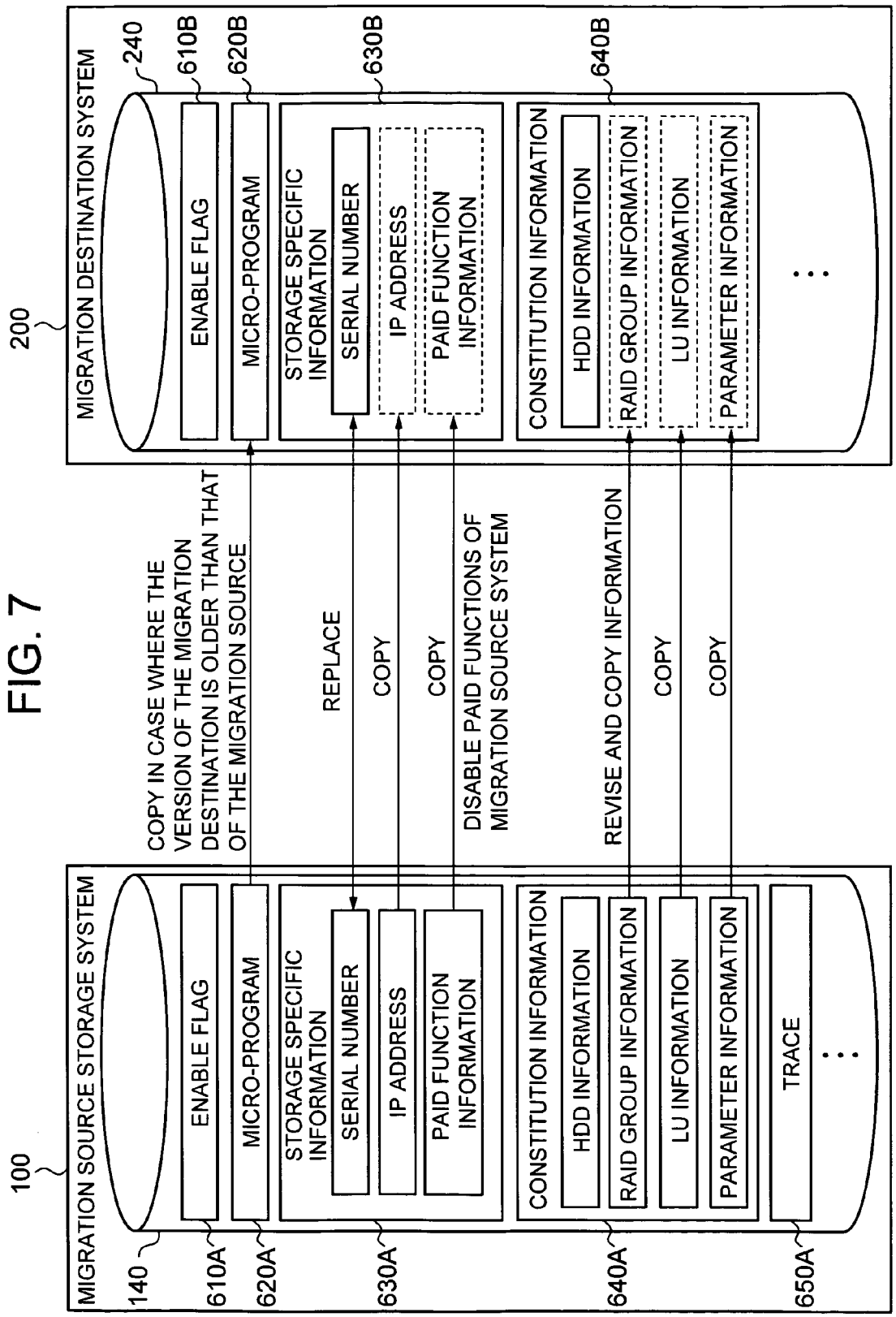
FIG. 7 is an explanatory diagram relating to the migration of system information according to this embodiment.

FIG. 7 is an explanatory diagram relating to the migration of the system information 600 according to this embodiment. In order to make the following description easy to understand, 'A' or 'B' are assigned to the numbers of the respective information to differentiate between the system information 600 of the migration source system 100 and the system information 600 of the migration destination system 200, as shown in FIG. 7.

The respective elements included in the system information 600 (also referred to as 'system information elements' hereinbelow) have different properties depending on the type. Therefore, different methods are adopted for the migration of the system information 600 for each system information element, depending on the type thereof. The following may be cited as examples of different properties. That is, in this embodiment, data migration to a new storage system (a storage system that is not operating) 200 is assumed. Therefore, depending on the type of system information element, when data migration is effected, there are system information elements that exist in the migration destination system 200 and system information elements that do not exist therein. For example, in FIG. 7, those system information elements that appear with a solid line exist in the migration destination system 200 when data migration is effected whereas those system information elements that appear with a broken line do not exist when data migration is effected.

A migration method that considers the respective properties of each of the various types of system information elements illustrated in this embodiment will be described specifically hereinbelow.

Figure 8:
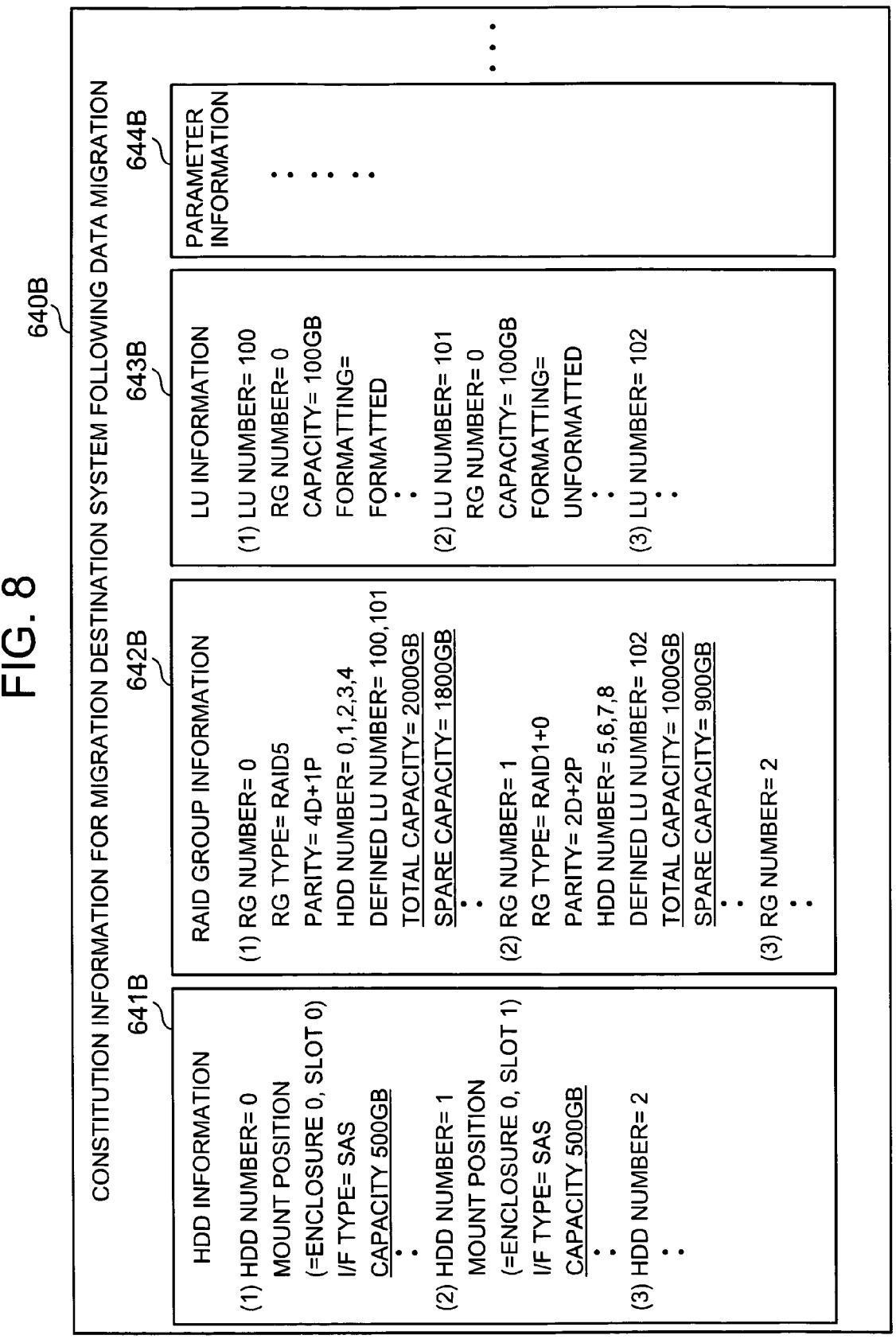
FIG. 8 shows an example of constitution information for a migration destination system following data migration.

The enable flag 610 will be described first. The enable flag 610 exists in the migration destination system 200 as shown in FIG. 8. First, as mentioned earlier, the enable flag is simply information indicating which information element package may be read from. Since the enable flag does not require a handover of the content from the migration source system 100, the enable flag need not be transferred. In this embodiment, copying of the enable flag 610 is not especially performed.

The micro-program 620 also exists in the migration destination system 200 as per the enable flag 610. Further, the micro-programs 620A and 620B of the two storage systems 100 and 200 are the same and are both programs for controlling both of the storage systems 100 and 200. Hence, in principle, the micro-program 620 need not be transferred. However, in cases where the versions of the micro-programs 620A and 620B of the two systems 100 and 200 are different and, in particular, where the version of the migration source system 100 is new, the micro-program 620 can also be transferred to render the version of the micro-program 620B of the migration destination system 200 the latest version. The migration method may be that of switching the micro-program 620B of the migration destination system 200 for the micro-program of the migration source system 100 and, therefore, the micro-program 620A of the migration source system 100 is copied as is (overwrites the micro-program 620B).

The storage-specific information 630 will be described next. The serial number 631, which is one item of the storage-specific information 630, is a number that is assigned to the storage systems 100 and 200 themselves and, therefore, differs for each of the migration source system 100 and migration destination system 200. The serial number 631 is used in order to discriminate the product and user and so forth when the sellers of the storage systems 100 and 200 support the user that purchased the product, for example. Further, it is expected that the user that has effected data migration to hand over to the migration destination system 200 desires to continuously receive the same support as before. Hence, the serial number 631A of the migration source system 100 hands over to the migration destination system 200 in order to continuously receive the same support. In other words, the serial number 631A of the migration source system 100 is copied to the migration destination system 200. On the other hand, the serial numbers 631 of the two systems 100 and 200 are the same only when the serial number 631A of the migration source system 100 has been copied to the migration destination system 200. The assignment of the same serial number 631 to the plurality of storage systems 100 and 200 is not desirable due to the properties of this information. Therefore, where the serial numbers 631 are concerned, a serial number 631B of the migration destination system 200 is copied to the migration source system 100 at the same time as the serial number 631A of the migration source system 100 is copied to the migration destination system 200. In other words, the respective serial numbers 631 of the migration source system 100 and migration destination system 200 replace one another.

The IP address 632 which is one information item of the storage-specific information 630 does not exist in the migration destination system 200. This is because the migration destination system 200 is in a pre-operational state where the settings of the network have not yet been made. The IP address 632 is utilized for a connection with the host 400 or the like and, if the IP address 632 is changed as a result of the data migration, setting changes for the host 400 or the like are then required. Hence, the IP address 632 is desirably transferred as is without being changed. Further, in this embodiment, because the migration source system 100 is replaced by the migration destination system 200 (after the data migration, the operation of the migration source system 100 is stopped and only the migration destination system 200 operates), the assignment of the same IP address 632 as that of the migration source system 100 to the migration destination system 200 is not problematic. Therefore, the IP address 632 of the migration source system 100 is copied as is to the migration destination system 200.

The paid function information 633 which is one information item of the storage-specific information 630 is handed over as is in the same way as the IP addresses 632. This is because, in this embodiment, because the storage systems 100 and 200 are replaced, the paid function which can be utilized by the migration source system 100 must also be available to the migration destination system 200. Hence, the paid function information 633A of the migration source system 100 is copied as is to the migration destination system 200. The paid function is a function that can be utilized only by one of the storage systems 100 and 200 because the paid function has one license. Following the data migration, the operation of the migration source system 100 is stopped. Therefore, although the same paid function is not utilized by the two systems 100 and 200, the paid function of the migration source system 100 is disable for the sake of licensing concerns. For example, information indicating the transferred paid function is deleted from the paid function information 633A of the migration source system 100.

The constitutional information 640 will be described next. The HDD information 641 is information indicating the storage device constitution of the storage systems 100 and 200 as mentioned earlier. That is, the HDD information 641 is information specific to the storage systems 100 and 200 and is not changed by data migration. Therefore, the migration of the HDD information 641 is not implemented.

The RAID group information 642 is information defining the LU constitution of the RAID group 150. Further, the LU information 643 is information defining the LU constitution. In this embodiment, the logical constitution of the RAID group 150 and LU and so forth of the migration source system 100 is handed over as is to the migration destination system 200 to replace those of the migration destination system 200. Hence, these information items 642 and 643 are transferred so that the constitution of the RAID group 150 and LU are not changed. Therefore, the LU information 643 of the migration source system 100 is copied as is to the migration destination system 200. However, in cases where the storage device constitution differs between the two systems 100 and 200, even when the RAID group information 642 is copied as is, it is not always true that the migration destination system 200 will operate normally. This is because the HDD number and the total capacity of the RAID group 150 which are determined with dependence on the storage device constitution are included in the RAID group information 642. Therefore, the RAID group information 642 is normally copied after being revised to conform to the storage device constitution of the migration destination system 200. If the specific processing is considered, for example, the new RAID group information 642B thus revised is generated by the migration source system 100 and the generated RAID group information 642B is copied to the migration destination system 200. In cases where the storage device constitution is the same, the RAID group information 642A of the migration source system 100 is copied as is to the migration destination system 200.

The parameter information 644 is information relating to the host 400 connected to the storage systems 100 and 200, as mentioned earlier. Because there is also no changed to the relationship with the connected host 400 even after the data migration, the parameter information 644 of the migration source system 100 is copied as is to the migration destination system 200.

The trace 650 is fault information for when a fault occurs in the storage systems 100 and 200, as mentioned earlier. That is, the trace 650 is information that is specific to the storage systems 100 and 200 and is not transferred.

The migration method for the system information 600 was described hereinabove. The revision of the constitution information 640 in cases where the constitution information 640 shown in FIG. 5 is transferred will be described next in specific terms with reference to FIG. 8.

FIG. 8 shows an example of constitution information 640B of the migration destination system 200 following data migration. Here, the constitution information 640 shown in FIG. 5 is the constitution information 640 of the migration source system 100 and is described by assigning 'A' to the reference numeral.

If we compare HDD information 641A in FIG. 5 and HDD information 641B in FIG. 8, it is clear that the storage device constitution of the migration source system 100 and migration destination system 200 differs. More particularly, in this example, the capacities of the two HDD 140 and 240 differ. In such a case, the RAID group information 642A is copied after being revised as mentioned earlier.

More specifically, the total capacity and spare capacity of the RAID group 150 are revised. As mentioned earlier, this is because the total capacity of the RAID group 150 is determined from the capacity of the HDD 140 and the parity constitution of the RAID group 150. This is also because the spare capacity is found from the total capacity and the used capacity. If we consider the RAID group 150 with RG number '0', because the capacity of the HDD 140 of the migration source system 100 is '250 GB', the total capacity is '1000 GB'. In contrast, because the capacity of the HDD 240 of the migration destination system 200 is '500 GB', the total capacity is revised to '2000 GB'. Further, as mentioned earlier, the used capacity of the RAID group 150 with RG number '0' is '200 GB'. Hence, by revising the total capacity from '1000 GB' to '2000 GB', the spare capacity is revised from '800 GB' to '1800 GB' (a value that is obtained by subtracting the used capacity from the total capacity).

The procedure and migration processing of the data migration according to this embodiment will be described hereinbelow with reference to FIGS. 9 to 14.

FIG. 9 is a flowchart showing the procedure for the data migration according to this embodiment.

First, the migration source system 100 is set to normal mode (migration SW 120: OFF, main SW 150: ON) and activated (S101). In addition, the migration destination system 200 is set to enclosure expansion mode (migration SW 220: ON, main SW 250: ON) and activated (S102). Further, after the two systems 100 and 200 are activated, the two systems 100 and 200 are mutually connected via an SAS cable communication cable 500 or other type of communication cable (S103, S104).

The migration tool 310 of the management PC 300 transmits a predetermined instruction to the CTL 110 of the migration source system 100 (S105). The expander 114 of the CTL 110 enables the phy state of the dedicated data migration port of the expander 114 in response to the instruction. As a result, the RAID control section 112 is able to identify the HDD 240 of the migration destination system 200 via the SAS controller 113 and is therefore capable of reading and writing data to and from the HDD 240 (S106).

Thus far, the preparatory operation required for data migration processing has been described. Data migration is possible following the completion of the preparatory operation.

The management tool 310 acquires the RAID group information 642A and LU information 643A from the migration source system 100 (S107). More specifically, the migration tool 310 first requests the acquisition of RAID group information 642A and LU information 643A with respect to the CTL 110 of the migration source system 100. The CTL 110 (RAID control section 112), which receives the request, reads the RAID group information 642A and LU information 643A from the HDD 140 of the migration source system 100 and transmits the information 642A and 643A thus read to the migration tool 310.

Thereafter, the migration tool 310 displays a predetermined user selection screen and accepts a selection by the user (S108). The user selection screen establishes items and so forth for selecting migration target user data (also called 'migration target data' hereinbelow), for example. The selection of the migration target data can be carried out for each RAID group 150 and LU, for example. That is, it is possible to determine whether the user data belonging to the RAID group 150 and LU is to be transferred. More specifically, a list of the names and IDs and so forth of the RAID group 150 and LU that the migration source system 100 comprises is displayed as the items for selecting migration target data, for example. The user selects the RAID group 150 and LU to which the user data that are to be transferred from the list belong. The RAID group 150 and LU of the migration source system 100 can be learned from the LU information 643A and RAID group information 642A obtained in S107. All of the user data may also be transferred unconditionally without providing such items for selecting the migration target data.

Thereafter, the migration tool 310 instructs the CTL110 of the migration source system 100 to perform the data transfer in response to an instruction from the user (S109). Thereupon, the information (ID and so forth) representing the RAID group 150 and LU selected in S108 is reported together to the CTL 110 as information representing the migration target data.

The CTL 110, which receives the data migration instruction, then carries out migration processing (S110). The migration processing is carried out as a result of the CPU of the RAID control section 112 executing the loaded program 621 by loading the migration program 621A stored in the HDD 140 in the memory. The details of the migration processing will be provided subsequently. Upon completion of the migration processing, the CTL 110 reports the completion of the migration to the migration tool 310 (S111).

The migration tool 310, which receives the report regarding the completion of migration, reports the completion of migration to the user via a display (S112).

Thereafter, the communication cable 500 is removed and the two systems 100 and 200 are separated (S113).

Subsequently, the two systems 100 and 200 are re-activated (S114, S115). Thereupon, the migration SW of the migration destination system 200 is set to OFF.

Data migration from the migration source system 100 to the migration destination system 200 is completed as a result of the user operation and the processing of the management PC and the two systems 100 and 200 being carried out in accordance with the above procedure.

During the time up until the report regarding the completion of migration is received after the migration tool 310 has issued an instruction to perform migration (from S109 to S112), the migration source system 100 may report the progress status of the migration processing to the migration tool 310 at regular or irregular intervals. The migration tool 310, which receives the report, is then able to report the progress status of the migration processing to the user via a GUI. Accordingly, the user is able to grasp the progress status of the migration processing in addition to the migration instruction via the management PC 300. Possible information indicating the progress status (also called the 'progress information' hereinbelow) that may be considered includes, for example, the relationship between the total capacity of the migration target data and the capacity after the migration is complete, the relationship between all of the LU of the migration target and, of these, those LU for which migration is complete, the time that has elapsed since the migration is started, and the time that is expected to pass until the migration is complete, and so forth.

Figure 21:
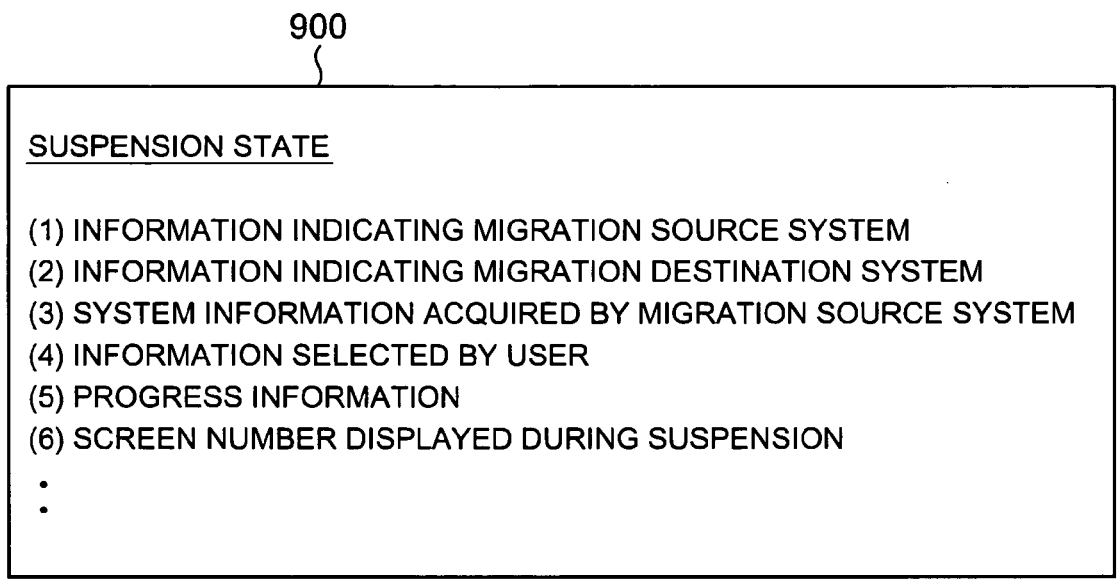
FIG. 21 is an example of a file in which progress information is recorded.

In addition, the migration tool 310 may also save the progress information received from the migration source system 100 in a file or the like. Thus, even in cases where the migration tool 310 is interrupted right in the middle of the migration processing, the user is able to report the progress status of the migration processing at the point where the processing was interrupted. As an example of a file in which the progress information is recorded, the file shown in FIG. 21 may be considered. As shown in FIG. 21, file 900 includes, for example, information representing the migration source system 100 and migration destination system 200, system information 600 acquired by the migration source system 100 (system information 600A of the migration source system 100 and/or system information 600B of the migration destination system 200), information representing the instruction content selected by the user in S108 and progress information and so forth.

FIG. 10 is a flowchart showing the migration processing according to this embodiment. This processing corresponds to S110 in FIG. 8.

The CTL 110 of the migration source system 100 that receives the data migration instruction (S201) acquires the system information 600B from the migration destination system 200 (S202). More specifically, the RAID control section 112 accesses the HDD 240 via the expander 214 of the migration destination system 200 and reads the system information 600B of the migration destination system 200 from the HDD 240. The system information 600B read here includes an enable flag 610B, version information 622B of the microprogram 620B, the serial number 631B, and HDD information 641B (system information elements of other types may also be included if necessary). The system information 600B thus read is stored in the memory that the RAID control section 112 comprises.

Thereafter, the CTL 110 acquires system information 600A of its own storage system (that is, migration source system) 100 from the HDD 140 (S203). More specifically, the RAID control section 112 accesses the HDD 140 of its own storage system 100, reads the system information 600A from the HDD 140, and stores the information 600 thus read in its own memory. Here, all the system information elements included in the system information 600A may be acquired or only those system information elements that are not being copied (the enable flag 610 and trace 650 and so forth) may be acquired.

Thereafter, the migration processing of the system information 600 is carried out (S204). The migration processing of the system information 600 will be described subsequently.

Subsequently, the user data migration processing is carried out (S205). That is, the CTL 110 references information representing the migration target data reported by the migration tool 310 (the IDs of the LUN and RAID group 150, for example) and transfers the migration target data of the HDD 140 specified by this information to the migration destination system 200. More specifically, after reading the migration target data from the HDD 140 to its own memory, the RAID control section 112 transfers the data thus read to the migration destination system 200 via the communication cable 500 and copies the data to a predetermined area of a predetermined HDD 240. The HDD 240 and area thereof to which the migration target data are copied are determined to conform to the post-migration system information 600B copied in S204.

Following completion of the processing for the migration of the system information 600 and user data, the CTL 110 deletes all the data stored in the HDD 140 of the migration source system 100 (system information 600A and user data) (S206). In cases where it is possible to select whether such deletion is to be performed via the selection screen of the migration tool 310 or where the user elects not to delete the data, the execution of the processing of S206 can also be excluded.

As a modified example of this embodiment, the following processing can also be performed. That is, the system information 600 may include a flag (also called an 'access flag' hereinbelow) which is 'ON' in cases where the storage device is accessed even once by the host 400 or an access flag of the migration destination system 200 in S202. Thereafter, in cases where the access flag is judged to be 'ON', the fact that the migration destination system 200 is already being utilized is reported to the migration tool 310 and the user and the migration processing is suspended. However, in cases where the access flag is judged to be 'OFF', the migration processing is executed in accordance with S203 to S205.

As a result of the execution of such processing, even in cases where a storage system 100, 200 which is not new (have some kind of data stored therein) is erroneously made the migration destination system 200, the deletion or destruction of data stored in the migration destination system 200 can be avoided. The access flag may also indicate whether each of the HDD 140, 240, RAID group 150, or LU has been accessed.

The migration processing according to this embodiment was described hereinabove. The migration processing of the system information 600 will be described hereinbelow with reference to FIGS. 11 to 14.

FIG. 11 is a flowchart showing the migration processing of the system information 600 according to this embodiment. This processing corresponds to S204 in FIG. 10.

When the migration processing of the system information 600 is started, the CTL 110 of the migration source system 100 selects one system information element from within the system information 600A of its own storage system 100 that was acquired in S203 (S301).

Thereafter, the type of the selected system information element is judged (S302). That is, it is judged which information element of the enable flag 610, micro-program 620, storage-specific information 630, constitution information 640, and trace 650 the selected system information element is equivalent to. In cases where the selected system information element is the storage-specific information 630, it is also judged whether the system information element is the serial number 631, IP address 632, or paid function 633. In addition, in cases where the system information element is the constitution information 640, it is also judged whether the system information element is the HDD information 641, RAID group information 642, LU information 643, or parameter information 644.

Thereafter, the CTL 110 generates post-migration system information elements for the selected system information element that correspond with the information element in accordance with the type and writes the post-migration system information element thus generated to the HDD 240 of the migration destination system 200 (S303). This processing differs depending on the type of the selected system information element and, therefore, the details of this processing will be provided with reference to FIGS. 12 to 14 for each type.

After the processing of S301 to S303 has been repeated for all the system information elements of its own storage system 100 (S304), this processing ends. After S304, if the content of two information element packages is the same in the migration destination system, the enable flag of the optionally selected information element package may be set to enable and the enable flag of the other information element packages may be set to disable. In addition, if at least one system information element is replaced with a new system information element in these two information element packages, the enable flag of the information element package in which the new system information element exists may be set to enable and the enable flag of the information element package in which the old system information element exists may be set to disable.

FIG. 12 is a flowchart showing migration processing relating to the micro-program 620.

In cases where the selected system information element is the micro-program 620 as a result of the judgment in S302, this processing is carried out in S303.

First, the CTL 110 compares the version information 622A of the micro-program 620A of the migration source system 100 and the version information 622B of the micro-program 620B of the migration destination system 200 (S401). The respective information is acquired in S202 and S203 and stored in the memory that the RAID control section 112 comprises.

In cases where, as a result of the comparison in S401, the version of the micro-program 620B of the migration destination system 200 is older than the version of the micro-program 620A of the migration source system 100 (S401: YES), the micro-program 620A of the migration source system 100 is copied to the migration destination system 200. More specifically, the RAID control section 112 transfers the micro-program 620A of the migration source system 100 stored in the memory to the migration destination system 200 via the SAS controller 113 and the expanders 114 and 214 and overwrites the area in which the micro-program 620B of the HDD 240 of the migration destination system 200 is stored. In this embodiment, because the system information 600 is constituted by two information element packages, the old-version micro-program 620B remains in the information element package that is enabled, while only the information element package that is disabled can be overwritten with the new-version micro-program 620A.

Thereafter, the enable flag 610B of the migration destination system 200 is overwritten (S403). That is, the enable flag 610B of the information element package in which the new-version micro-program 620B is contained is changed so that the new-version micro-program 620B copied in S402 is enabled.

However, in cases where, as a result of the comparison in S401, the version of the micro-program 620B of the migration destination system 200 is newer than the version of the micro-program 620A of the migration source system 100 or where the two versions are the same (S401: NO), the migration of the micro-program 620 is not performed.

Figure 13:
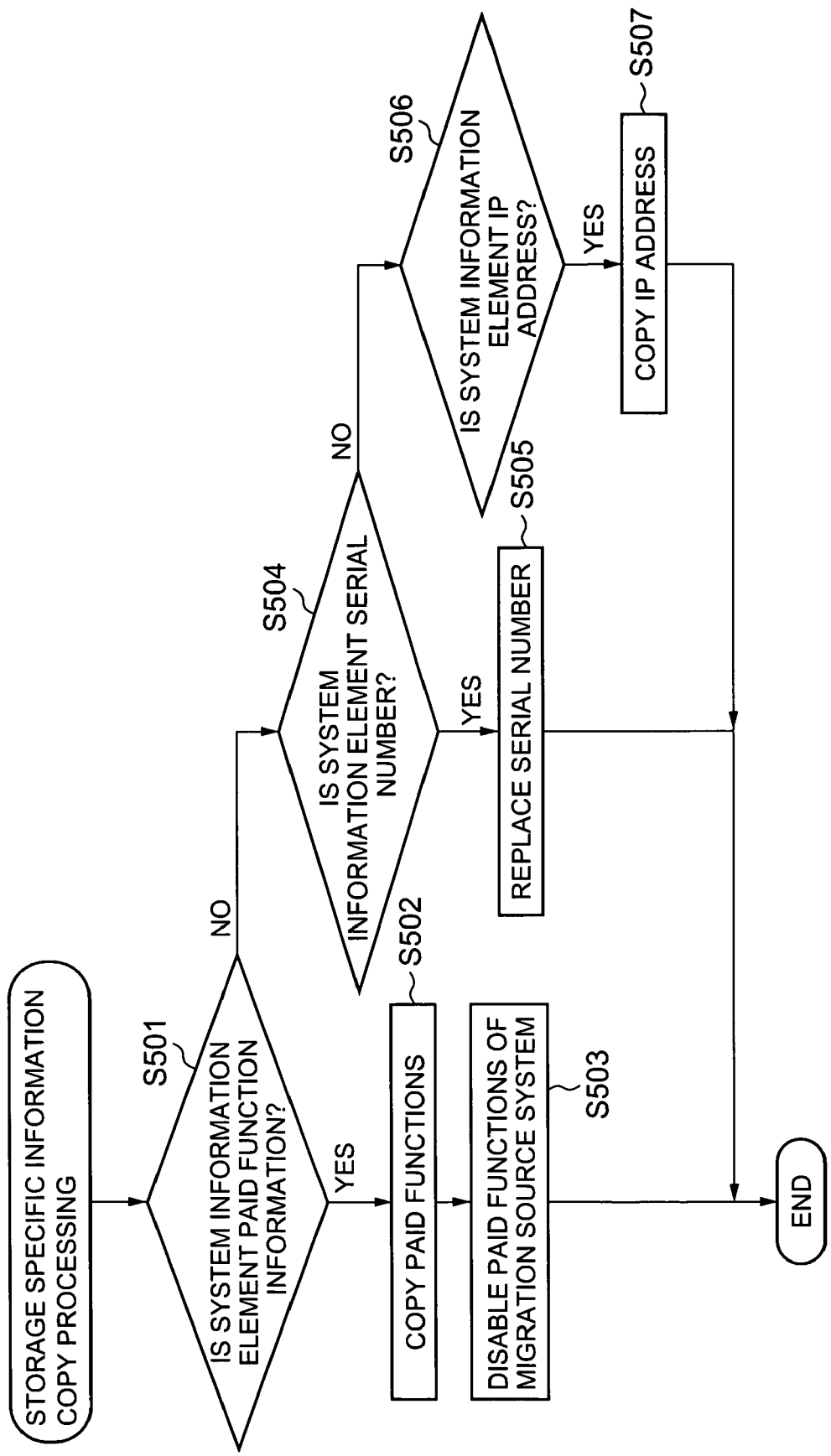
FIG. 13 is a flowchart showing migration processing relating to storage-intrinsic information.

FIG. 13 is a flowchart showing the migration processing relating to the storage-specific information 630.

In cases where, as a result of the judgment in S302, the selected system information element is the storage-specific information 630, this processing is performed in S303.

In cases where the selected system information element is the paid function information 633 (S501: YES), the paid function information 633A of the migration source system 100 is copied to the migration destination system 200 (S502).

Thereafter, the paid function of the migration source system 100 is disabled (S503). In this embodiment, the paid function information 633 is information indicating what the installed paid functions (available paid functions) are and, therefore, the paid functions are disabled by deleting this information. In cases where the paid function information 633 is a flag indicating whether all of the pre-installed paid functions are available, the paid functions are disabled by changing all the flags to 'OFF'.

In addition, in cases where the selected system information elements are serial numbers 631 (S504:YES), the serial number 631A of the migration source system 100 and the serial number 631B of the migration destination system 200 are replaced (S505). That is, the RAID control section 112 overwrites the area in which the serial number 631B of the HDD 240 of the migration destination system 200 is stored with the serial number 631A of the migration source system 100 stored in the memory of the RAID control section 112. The RAID control section 112 also overwrites the area in which the serial number 631A of the HDD 140 of its own storage system 100 with the serial number 631B of the migration destination system 200 stored in the memory.

In addition, in cases where the selected system information element is the IP address 632 (S506: YES), the IP address 632A of the migration source system 100 is copied to the migration destination system 200 (S507).

Figure 14:
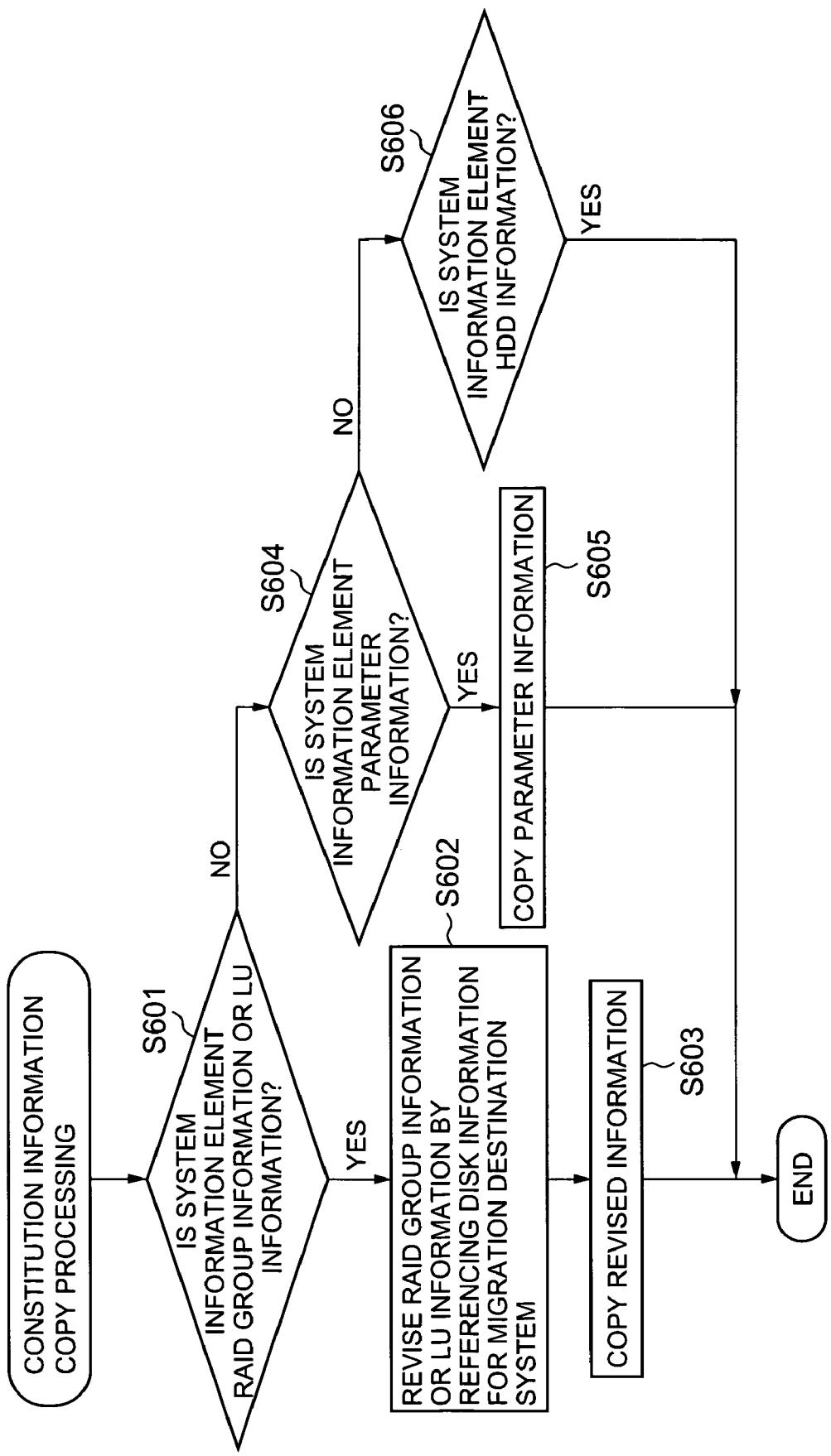
FIG. 14 is a flowchart showing migration processing relating to constitutional information.

FIG. 14 is a flowchart showing the migration processing relating to the constitutional information 640.

In cases where, as a result of the judgment in S302, the selected system information element is the constitution information 640, this processing is carried out in S303.

The selected system information element is RAID group information 642 or LU information 643 (S601: YES), the RAID group information 642A or LU information 643A of the migration source system 100 is revised by considering the difference in the storage device constitution between the two systems 100 and 200 (S602).

Thereafter, the revised RAID group information 642 or LU information 643 is copied to the migration destination system 200 (S603).

In addition, in cases where the selected system information element is the parameter information 644 (S604: YES), the parameter information 644B of the migration source system 100 is copied to the migration destination system 200 (S604).

Furthermore, in cases where the selected system information element is the disk information 641 (S606: YES), migration processing is not performed.

The procedure and migration processing for the data migration according to this embodiment was described hereinabove.

According to this embodiment, the two storage systems are connected without duplication of the SAS addresses at the backend and data migration at the backend is possible.

In addition, according to this embodiment, not only user data but also system information 600 can be transferred in data migration. Therefore, in order to make the environment of the post-migration storage system the same environment as the one prior to migration, the user may also reset the system information following data migration.

Second Embodiment

In this embodiment, in addition to the data migration with respect to the non-operational storage systems 100, 200, data migration to operational storage systems 100, 200 may be considered. Further, following data migration, a parallel operation of the two systems 100, 200 after data migration may also be considered. In other words, this embodiment is not restricted to the replacement of the storage systems 100, 200 that was assumed in the first embodiment. Rather, data migration of all or part of the user data between two systems 100, 200 operating in parallel is also assumed. The constitution of the storage systems 100, 200 that implement this embodiment and the migration method of the system information 600 in cases where the migration destination system 200 is operating differs partly from that of the first embodiment. The differences from the first embodiment will be mainly described hereinbelow.

Figure 15:
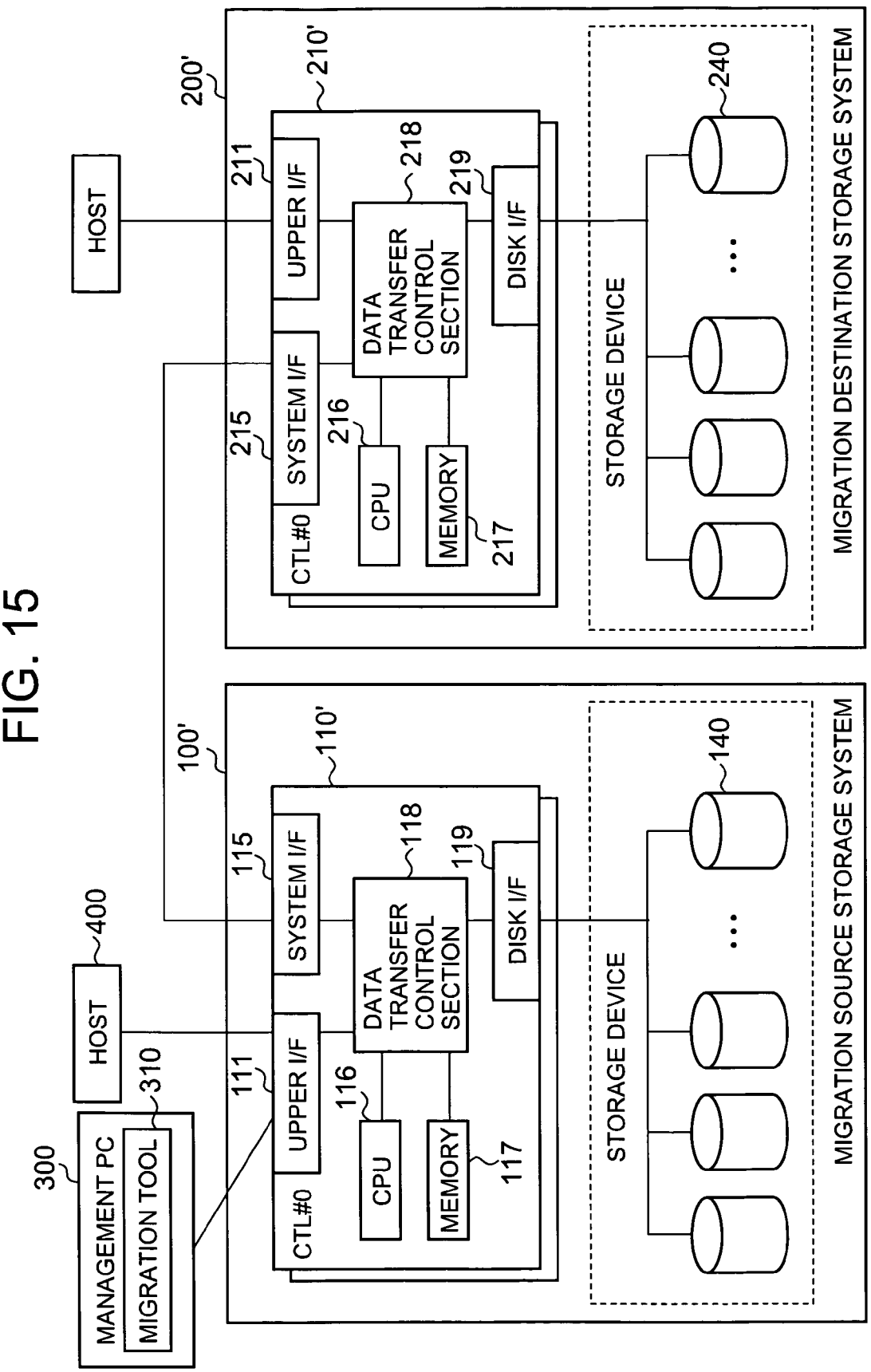
FIG. 15 shows a constitutional example of a storage system comprising a data migration control device according to a second embodiment.

FIG. 15 shows a constitutional example of the storage systems 100, 200 comprising a data migration control device according to this embodiment.

As per the first embodiment, the migration source system 100 and migration destination system 200 are connected via the communication cable 500. The communication cable 500 can be an FC (Fibre Channel) cable, LAN cable, or the like, for example, depending on the interface that the system I/F 115, 215 comprise. In addition, the management PC 300 is connected to the migration source system 100 via a LAN or other communication network.

The management PC 300 and host 400 are the same as those of the first embodiment. In addition, so too in this embodiment, the constitution of the migration source system 100 and migration destination system 200 are basically the same and, therefore, the constitution of the storage systems 100 and 200 will be described by taking the migration source system 100 as a representative example. The respective parts to which the same reference numerals as the reference numerals of the first embodiment have been assigned are the same as the corresponding parts of the first embodiment. The new parts are described here.

The storage system 100 of this embodiment contains, for example, a duplexed CTL 110' and a storage device. The constitution of the storage device is the same as that of the first embodiment.

The CTL 110' comprises, for example, an upper I/F 111, a system I/F 115, a CPU 116, a memory 117, a data transfer control section 118, and a disk I/F 119.

The data transfer control section 118 corresponds to the RAID control section 112 of the first embodiment and executes command processing in co-operation with the CPU 116 and memory 117.

The disk I/F 119 corresponds to the SAS controller 113 and expander 114 of the first embodiment and writes and reads data to and from the HDD 140 in response to instructions from the data transfer control section 118.

The system I/F 115 is an interface for a connection to an external device. The two systems 100 and 200 are connected via the system I/F 115, 215.

Figure 16:
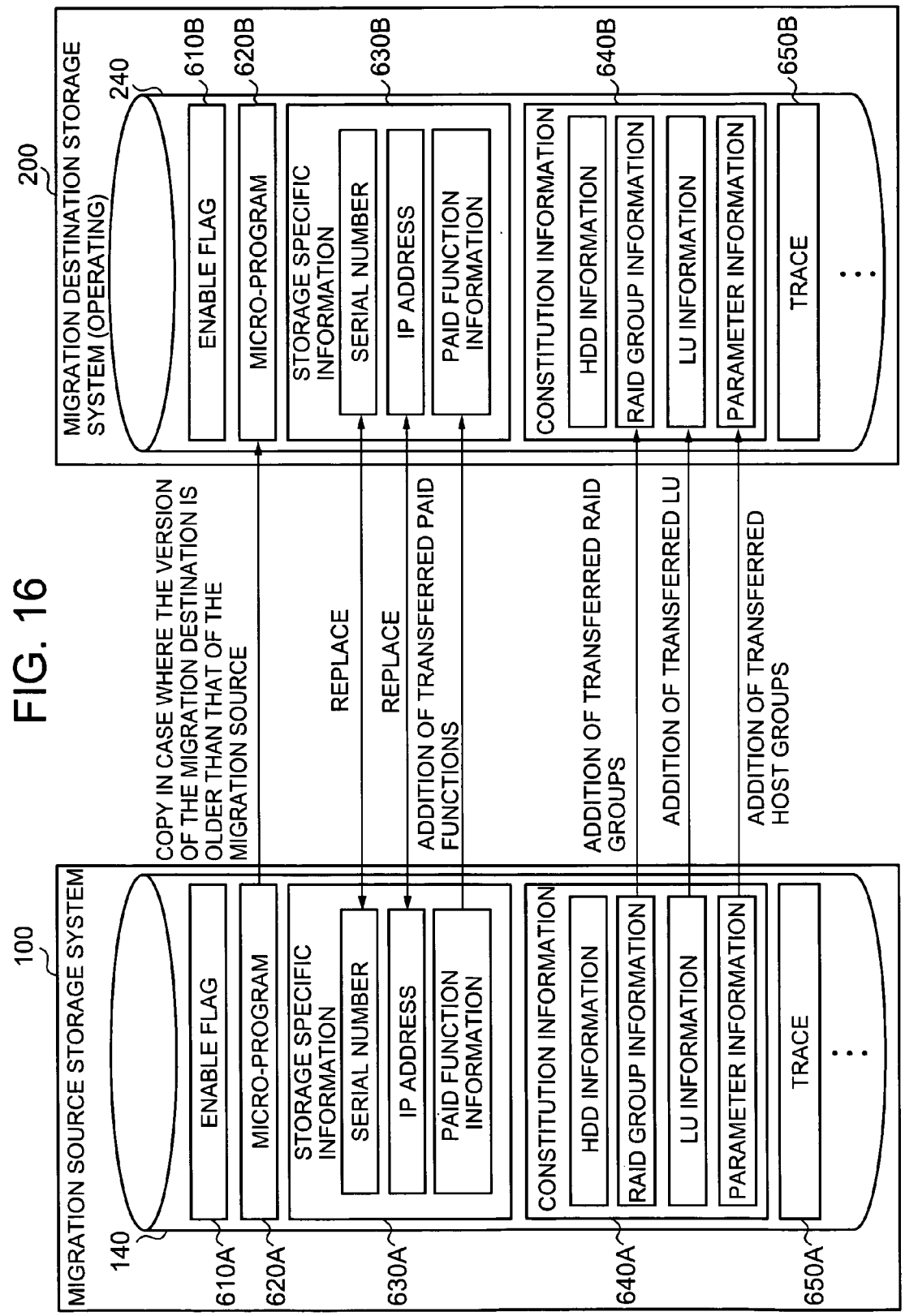
FIG. 16 is an explanatory diagram relating to migration of system information in a case where a migration destination system is operating.

FIG. 16 is an explanatory diagram relating to the migration of the system information 600 in cases where the migration destination system 200 is operating. In this embodiment, the two systems 100, 200 also operate in parallel after the data migration.

The fact that the enable flag 610, HDD information 641, and trace 650 are not transferred and that the micro-program 620 is transferred or not transferred depending on the version are as per the first embodiment. The migration method for the other system information elements will be described in specific terms hereinbelow.

First, the serial number 631 and IP address 632 will be described. Because the migration destination system 200 is operating, the system information elements 631 and 632 also depend on the migration destination system 200. In addition, following the data migration, the two systems 100, 200 operate in parallel and, therefore, there is no need for the system information elements 631, 631 to be replaced. Therefore, the serial number 631 and IP address 632 are not especially transferred. However, there may sometimes also be the desire to exchange the system information elements 631 and 632 between the migration source system 100 and migration destination system 200. In such a case, the respective serial numbers 631 or IP addresses 632 of the migration source system 100 and migration destination system 200 replace one another. The user is able to choose whether to replace the system information elements 631 and 632 via the selection screen provided by the migration tool 310, for example.

The migration method for the paid function information 633 changes depending on which of the systems 100, 200 utilizes the paid functions available to the migration source system 100. That is, in cases where the paid functions available to the migration source system 100 are utilized continuously by the migration source system 100, the migration of the paid function information 633 is not performed. However, in cases where all or some of the paid functions available to the migration source system 100 are utilized by the migration destination system 200, the migration target paid functions are added to the paid function information 633B of the migration destination system 200. In addition, the migration target paid functions are deleted from the paid function information 633A of the migration source system 100. Following the data migration, the choice of which paid function is used by which system 100, 200 can be made via the selection screen provided by the migration tool 310 as is the case for the selection of the IP address 632.

The respective migration methods of the RAID group information 642, LU information 643, and parameter information 644 are basically the same. In the case of the RAID group information 642, information defining the migration target RAID group 150 (all or some of the RAID groups 150 included in the RAID group information 642A of the migration source system 100) is added to the RAID group information 642B of the migration destination system 200. The information defining the migration target RAID group 150 is then deleted from the RAID group information 642A of the migration source system 100. However, in the case of the LU information 643, the information defining the migration target LU (all or some of the LU included in the LU information 643A of the migration source system 100) is added to the LU 643B of the migration destination system 200. The information defining the migration target LU is then deleted from the LU information 643A of the migration source system 100. In addition, in the case of the parameter information 644, the information defining the migration target host group (all or some of the host groups included in the parameter information 644A of the migration source system 100) is added to the parameter information 644B of the migration destination system 200. The information defining the migration target host group is then deleted from the parameter information 644A of the migration source system 100. The choice of which RAID groups 150, LU or host groups are transferred can likewise be made via the selection screen provided by the migration tool 310.

The migration method for the system information 600 in cases where the migration destination system 200 is operating was described hereinabove. A case in which the constitution information 640 shown in FIG. 5 is transferred and a case where the parameter information 644 shown in FIG. 6 is transferred, in accordance with the migration method, will be described next in specific terms with reference to FIGS. 17 and 18.

Figure 17:
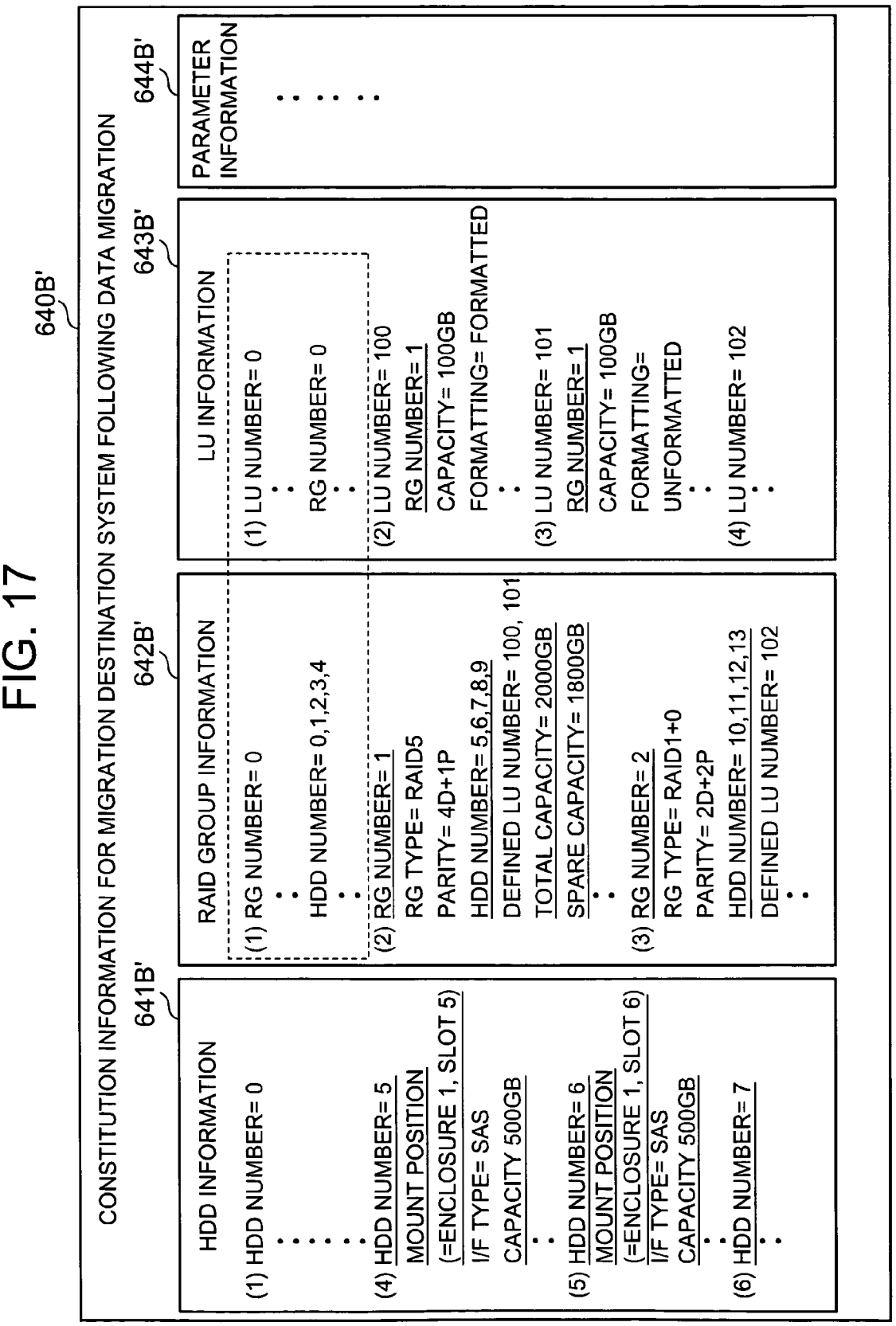
FIG. 17 shows an example of constitutional information of the migration destination system after data migration in a case where the migration destination system is operating.

FIG. 17 shows an example of constitution information 640B' of the migration destination system 200 following data migration in cases where the migration destination system 200 is operating.

Unlike the case where the migration destination system 200 is not operating (FIG. 8), in cases where the migration destination system 200 is operating, the RAID groups 150 and LU in the migration destination system 200 are normally already defined. Further, information defining RAID groups 150 and LU is included in the RAID group information 642B and LU information 643B of the migration destination system 200. In the case of FIG. 17, the information enclosed by the broken line is information that defines the already defined RAID group 150 and LU. That is, in the case of FIG. 17, the RAID group 150 with RG number '0' and the LU with LU number '0' are already defined. This will be described in detail hereinbelow by taking the RAID group 150 by way of example.

As mentioned earlier, when a RAID group 150 is transferred, the information defining the migration target RAID group 150 is added to the RAID group information 642B' of the migration destination system 200. Therefore, the constitution information 640B' of the migration destination system 200 following the data migration is the result of adding the information (part outside the broken line) defining the migration target RAID group 150 and LU to the information (part inside the broken line) that defines the already defined RAID group 150 and LU, as shown in FIG. 17. In addition to the total capacity and spare capacity being revised As per the first embodiment, in this embodiment, the RG numbers and HDD numbers and so forth are also revised so that same conform to the RG numbers and HDD 240 assigned to the migration target RAID group 150. In this example, the RAID group 150 with RG number '0' is already defined and the RAID group 150 is assigned five HDD 240 with the HDD numbers '0, 1, 2, 3, 4'. Hence, the migration target RAID group 150 has an unused HDD 240 other than the HDD 240 with the HDD numbers '0, 1, 2, 3, 4' assigned thereto. For this reason, five HDD 240 with the HDD numbers '5, 6, 7, 8, 9' are assigned to the RAID group 150 with the RG number '1'. The RAID group 150 with the RG number '1' in FIG. 14 corresponds to the RAID group 150 with the RG number '0' in FIG. 5 (prior to migration).

Figure 18:
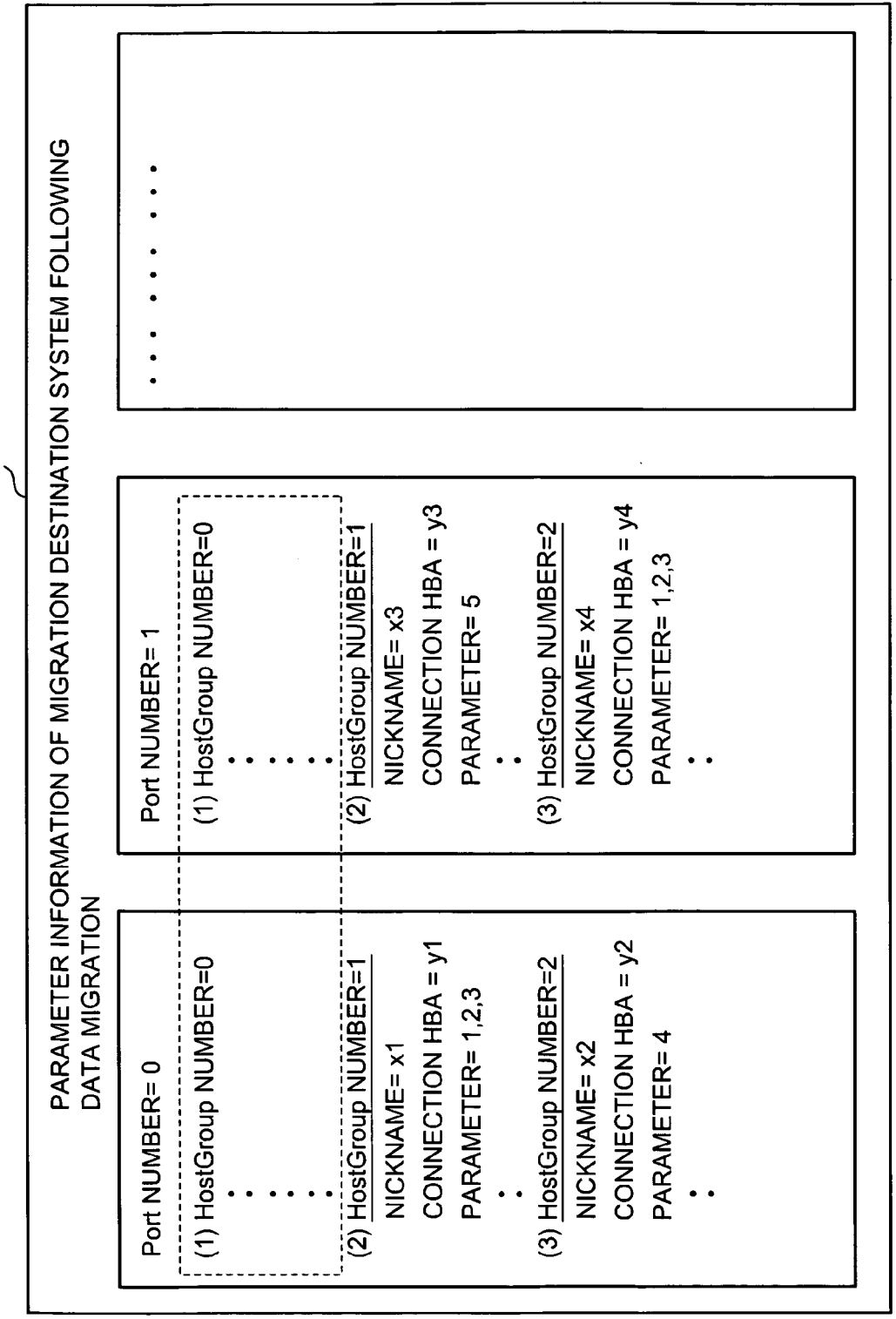
FIG. 18 shows an example of parameter information for the migration destination system following data migration in a case where the migration destination system is operating.

FIG. 18 shows an example of the parameter information 644B' of the migration destination system 200 following data migration in cases where the migration destination system 200 is operating.

As mentioned earlier, the migration method of the parameter information 644 is basically the same as the migration method of the RAID group information 642 and LU information 643. In other words, when the host group is transferred, the information defining the migration target host group is added to the parameter information 644B' of the migration destination system 200. Therefore, the parameter information 644B' of the migration destination system 200 following migration is obtained by adding the information (part outside the broken line) defining the migration target host groups to the already defined host group (part inside the broken line), as shown in FIG. 18. Here, the 'host group' is one or more logical units (LU) with which a host mode is associated. A 'host mode' is the I/O format (that is, I/O format) that differs depending on the type of OS (operating system) of the host 400. The storage system is able to associate the host mode with one or more LU that may be identified by the host computer 400.

The procedure for data migration according to this embodiment will be described hereinbelow.

Figure 19:
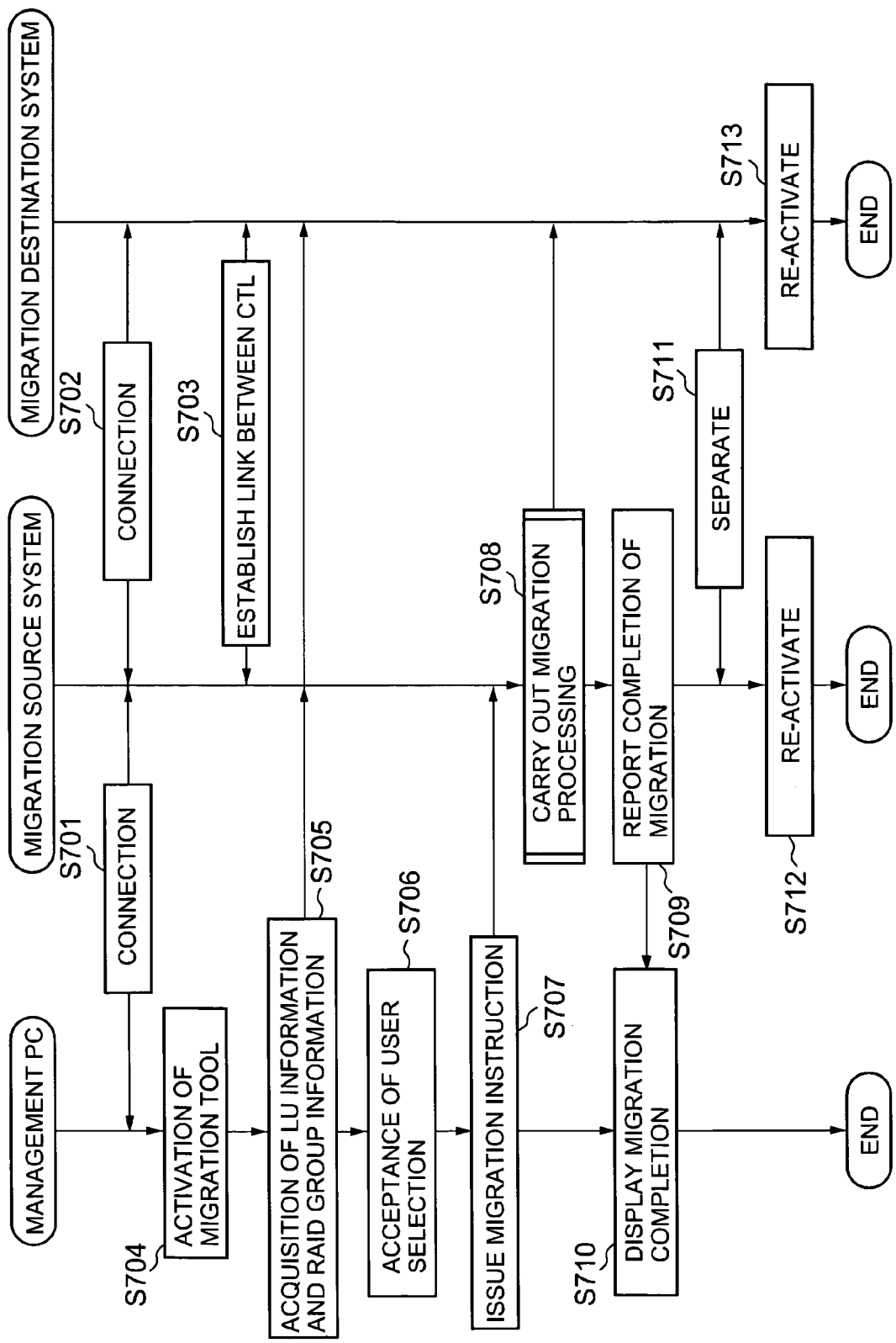
FIG. 19 is a flowchart showing the data migration procedure according to a second embodiment.

FIG. 19 is a flowchart showing the procedure for data migration according to this embodiment.

First, the management PC 300 and migration source system 100 are connected and the migration source system 100 and the migration destination system 200 are connected (S701, S702). As a result, a link is established between the CTL 110' of the migration source system 100 and the CTL 210' of the migration destination system 200 (S703).

The migration tool 310 is activated next (S704). If the migration tool 310 is activated, the migration tool 310 acquires the RAID group information 642A, LU information 643A, and parameter information 644A from the migration source system 100 (S705).

The migration tool 310 then displays a predetermined user selection screen and accepts a selection from the user (S706). Here, for example, the choice is made with respect to whether to replace the serial number 631 and IP address 632, which system 100, 200 utilizes which paid function, and which RAID groups 150, LU or host groups are transferred.

Thereafter, the migration tool 310 issues an instruction for data migration to the CTL 110' of the migration source system 100 in accordance with an instruction from the user (S707). Thereupon, the CTL 110' reports various information selected in S706.

The CTL 110', which receives the data migration instruction, carries out migration processing (S708). The migration processing is executed as a result of the CPU 116 loading the migration program 621A stored in the HDD 140 in the memory 117 and executing the loaded program 621. The migration processing is basically the same as the first embodiment only the migration method for the system information 600 varies. When the migration processing is complete, the CTL110' reports completion of the migration to the migration tool 310 (S709).

The migration tool 310, which receives the report regarding the completion of the migration, reports this fact to the user by means of a display to that effect (S710).

Thereafter, the communication cable 500 is removed and the two systems 100, 200 are separated (S711).

Subsequently, the two systems 100, 200 are re-activated (S712, S713).

Here, the user selection screen that is displayed in S108 and S706 will be described in detail by taking a case where a migration target LU is selected as an example.

Figure 20:
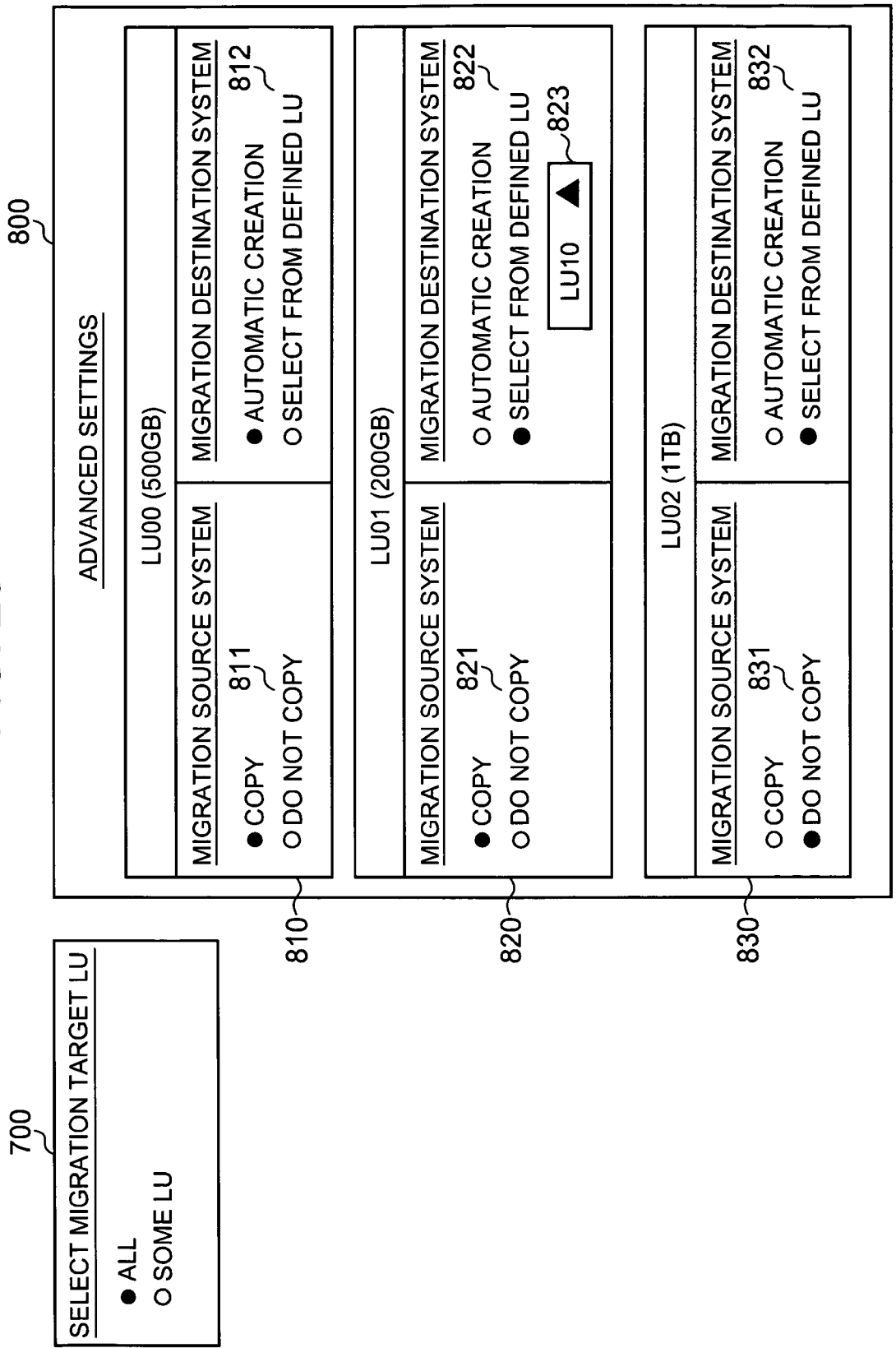
FIG. 20 shows an example of a user selection screen for selecting a migration target LU.

FIG. 20 shows an example of the user selection screens 700 and 800 for selecting the migration target LU.

Provided in the screen 700 is, for example, a check box that makes it possible to select all the LU that the migration source system 100 comprises as the migration target LU or some of the LU as the migration target LU. As per FIG. 20, when 'All' is selected, all of the LU are selected as migration target LUs. However, when 'some LU' is selected, a screen 800 for specifically selecting which LU are migration targets is displayed.

The screen 800 provides selection areas 810, 820, and 830 relating to all or some LU that the migration source system 100 comprises, for example. The respective selection areas 810, 820, and 830 are provided with first check boxes 811, 821, and 831 which make it possible to choose whether to copy the LU. In addition, provided next to the respective first check boxes 811, 821, and 831 are second check boxes 812, 822, and 832 that allow LU to be automatically generated in the migration destination system 200 and permit a decision with regard to whether the data of the LU are transferred to the existing LU without automatically generating the LU. As per 'LU00' and 'LU01' in FIG. 20, when 'copy' is selected in the first check boxes 811 and 821, the corresponding second check boxes 812 and 822 are enabled. However, as per 'LU02', when 'do not copy' is selected for the first checkbox 831, the corresponding second check box 832 is disabled. In addition, as per 'LU00', when 'automatic generation' is selected for the second checkbox 812, the LU corresponding to the 'LU00' is automatically generated in the migration destination system 200. However, as per 'LU01', when 'Select from defined LU' is selected for the second check box 822, a list box 823 that permits the selection of any of the LU that the migration destination system 200 comprises is displayed so that an existing LU can be selected. Because 'LU10' is selected in the case of FIG. 20, the data of 'LU02' of the migration source system 100 come to be transferred to the 'LU10' migration destination system 200.

The constitution of the screens 700 and 800 is not limited to that described above. The constituent elements of the screens such as the selection areas 810, 820, and 830, the check boxes 811, 812, 813, 821, 822, and 832, and the list box 823 may also be disposed in varied positions or other constituent elements may be added. In addition, another user interface may also be used in place of the check boxes and list box.

The procedure for the data migration according to this embodiment was described above. According to this embodiment, system information 600 can be transferred in addition to user data also when transferring all or some of the user data between the storage systems 100, 200 that are operating in parallel and is not limited to replacement between the storage systems 100, 200.

A few embodiments of the present invention were illustrated for the sake of describing the present invention, there being no intention to limit the scope of the present invention to these embodiments. The present invention can also be implemented in a variety of other forms without departing from the spirit of the present invention.

For example, although a case where the migration source system 100 and migration destination system 200 are connected as a pair has been assumed in this embodiment, a plurality of migration destination systems 200 may also be connected to the one migration source system 100. Further, the same data can also be transferred simultaneously from one migration source system 100 to a plurality of migration destination systems 200.

What is claimed is:

1. A storage system comprises:
a first storage system connected to a second storage system by communication cable;
a processor (CPU);
wherein the second storage system includes:
   a second controller,
   a second interface device, and
   a second storage device that includes:
      a second user area which is a storage area accessible to a host and in which data accessed by the host are stored and a second system area which is a storage area inaccessible to the host and in which second system information is stored, wherein the second system information includes a second micro-program for controlling the first and second storage systems, and a second serial number relating to the second storage system;
wherein the first storage system comprises:
   a first interface device;
   a first storage device that includes:
      a first user area which is a storage area accessible to the host and in which data accessed by the host are stored, and a first system area which is a storage area inaccessible to the host and in which first system information is stored, wherein the first system information includes a first micro-program for controlling the first and second storage systems, a first serial number relating to the first storage system, and a first Internet Protocol (IP) address; and a first controller, wherein when the first controller migrates data stored in the first system area to the second system area in the second storage system through the communication cable, and wherein the first controller is configured:

to read system information elements of the first system information from the first system area;

to compare a version of the first micro-program to a version of the second micro-program and, when the version of the second micro-program is older than the version of the first micro-program, to transfer the first micro-program to the second storage system and replace the second micro-program in the second system information with the first micro-program;

to transfer the first serial number to the second storage system and replace the second serial number in the second system information with the first serial number; and to transfer the IP address to the second storage system and store the IP address in the second system area;

wherein the first interface device and the second interface device are connected, and wherein a first switch device is connected to the first controller;

wherein the first interface device is one or more physical ports of a plurality of physical ports that the first switch device comprises and uses to connect to the first controller;

wherein the second interface device is one or more physical ports of a plurality of physical ports that a second switch device comprises and uses to connect to the second controller;

the second storage device is connected to one or more other physical ports of the plurality of physical ports that the second switch device comprises; and the first controller is configured to identify the second storage device via the first switch device and the second switch device, and is configured to write system information elements via the first interface device and the second interface device to the second system area of the second storage device.

2. The storage system according to claim 1, wherein the first controller is configured to modify the system information elements of the first system information from the first system area to content that does not duplicate that of existing system information elements in cases where system information elements that match the system information elements are included in the second system information, and to transmit modified system information elements to the second storage system.

3. The storage system according to claim 1, wherein:
the first storage device includes a plurality of first media drives;
the second storage device includes a plurality of second media drives;
system information elements in the first system information include first drive information that includes, for each of the first media drives, a first drive information element relating to the first media drive, first RAID group information that includes, for each of a plurality of first RAID groups, a first RAID group information element relating to media drives in the first RAID group and/or first logical unit (LU) information that includes, for each of a plurality of first LUs, a first LU information element relating to a first LU that is formed based on the plurality of first media drives;

system information elements in the second system information include second drive information that includes, for each of the second media drives, a second drive information element relating to the second media drive, second RAID group information that includes, for each of a plurality of second RAID groups, a second RAID group information element relating to media drives included in the second RAID group and/or second LU information that has, for each of a plurality of second LUs, a second LU information element relating to a second LU that is formed based on the plurality of second media drives;

the first drive information is a non-migration target; and the first controller is configured to modify the first RAID group information and/or first LU information based on the second drive information and to transmit the modified first RAID group information and/or the first LU information.

4. A migration system, comprising:
a migration source storage system connected to a migration destination storage system by communication cable;
a processor (CPU);
wherein the migration source storage system having a first interface device, a first controller, and a first storage device that comprises:

a first user area which is a storage area accessible to a host and in which data accessed by the host are stored, and a first system area which is a storage area inaccessible to the host and in which first system information is stored, wherein the first system information includes a first micro-program for controlling the migration source storage system and the migration destination storage system, a first serial number relating to the migration source storage system, and a first Internet Protocol (IP) address;

a migration destination storage system having a second device interface, a second controller, and a second storage device comprising:

a second user area which is a storage area accessible to the host and in which data accessed by the host are stored, and a second system area which is inaccessible to the host and in which second system information is stored, wherein the second system information includes a second micro-program for controlling the migration source storage system and the migration destination storage system, and a second serial number relating to the migration destination storage system;

wherein the migration source storage system is configured to, when data stored in the first system area is migrated to the second system area:

in response to a determination that a version of the second micro-program is older than a version of the first micro-program, to transfer the first micro-program to the migration destination storage system and replace the second micro-program in the second system information with the first micro-program;

to transfer the first serial number to the migration destination storage system and replace the second serial number in the second system information with the first serial number; and to transfer the IP address to the migration destination storage system and store the IP address in the second system area;

wherein the first interface device and the second interface device are connected;

wherein a first switch device is connected to the first controller;

wherein the first interface device is one or more physical ports of a plurality of physical ports that the first switch device comprises and uses to connect to the first controller;

wherein the second interface device is one or more physical ports of a plurality of physical ports that a second switch device comprises and uses to connect to the second controller;

the second storage device is connected to one or more other physical ports of the plurality of physical ports that the second switch device comprises; and the first controller is configured to identify the second storage device via the first switch device and the second switch device, and is configured to write system information elements via the first interface device and the second interface device to the second system area of the second storage device.

5. The migration system according to claim 4, further comprising a management device that is connected to at least one of the migration source storage system and the migration destination storage system, wherein the management device comprises:

a storage resource;

an information-gathering section that is configured to gather the first system information and the second system information and stores the first system information and the second system information in the storage resource;

a display section that is configured to display a migration target designation screen, wherein the migration target designation screen is configured to accept a designation of a migration target from a user based on the gathered first system information and second system information; and a migration instruction section that is configured to transmit a migration instruction including information representing the migration target designated by the user to at least one of the migration source storage system and the migration destination storage system;

wherein the migration source storage system or the migration destination storage system is configured to read the system information elements from the first system area in response to the migration instruction.

6. A method for data migration that is performed by a system that includes a migration source storage system and a migration destination storage system, the method comprising:

the migration source storage system includes:
a first controller, a first interface device, and
a first storage device that includes a first user area which is a storage area accessible to a host and in which data accessed by the host are stored, and a first system area which is a storage area inaccessible to the host and in which first system information is stored, wherein the first system information includes a first micro-program for controlling the migration source storage system and the migration destination storage system, a first serial number relating to the migration source storage system, and a first Internet Protocol (IP) address; the migration destination storage system includes:

a second interface device, a second controller, and a second storage device including a second user area which is a storage area accessible to a host and in which data accessed by the host are stored, and a second system area which is a storage area inaccessible to the host and in which second system information which is information is stored, wherein the second system information includes a second micro-program for controlling the migration source storage system and the migration destination storage system, and a second serial number relating to the migration destination storage system;

wherein the first interface device and the second interface device are connected;

wherein a first switch device is connected to the first controller;

wherein the first interface device is one or more physical ports of a plurality of physical ports that the first switch device comprises and uses to connect to the first controller;

wherein the second interface device is one or more physical ports of a plurality of physical ports that a second switch device comprises and uses to connect to the second controller of the second storage system;

the second storage device is connected to one or more other physical ports of the plurality of physical ports that the second switch device comprises; and wherein the method comprises:

the migration source storage system migrating data stored in the first system area to the second system area, wherein the migrating includes:

comparing a version of the first micro-program to a version of the second micro-program and, if the version of the second micro-program is older than the version of the first micro-program, transferring the first micro-program to the migration destination storage system and replacing the second micro-program in the second system information with the first micro-program;

transferring the first serial number to the migration destination storage system and replacing the second serial number in the second system information with the first serial number; and transferring the IP address to the migration destination storage system and store the IP address in the second system area; and the first controller identifying second storage device via the first switch device and the second switch device; and the first controller writing system information elements via the first interface device and the second interface device to the second system area of the second storage device.

7. A storage system comprises:

a second storage system connected to a first storage system by communication cable;

a processor (CPU);

wherein the first storage system includes a first controller, a first interface device, and a first storage device that includes:

a first interface device, a first user area which is a storage area accessible to a host and in which data accessed by the host are stored, and a first system area which is a storage area inaccessible to the host and in which first system information is stored, wherein the first system information includes a first micro-program for controlling the first and second storage systems, a first serial number relating to the first storage system, and a first Internet Protocol (IP) address;

the second storage system comprising:

a second interface device;

a second storage device including a second user area which is a storage area accessible to the host and in which data accessed by the host are stored, and a second system area which is a storage area inaccessible to the host and in which second system information is stored, wherein the second system information includes a second micro-program for controlling the first and second storage systems, and a second serial number relating to the second storage system; and a second controller that, when data stored in the first system area is migrated to the second system area in the second storage system through the communication cable, is configured to:

in response to a determination at the first controller that a version of the second micro-program is older than a version of the first micro-program, to receive the first micro-program from the first storage system and replace the second micro-program in the second system information with the first micro-program;

to receive the first serial number from the first storage system and replace the second serial number in the second system information with the first serial number; and to receive the IP address from the first storage system and store the IP address in the second system area;

wherein the first interface device and the second interface device are connected; and wherein a first switch device is connected to the first controller;

wherein the first interface device is one or more physical ports of a plurality of physical ports that the first switch device comprises and uses to connect to the first controller;

wherein the second interface device is one or more physical ports of a plurality of physical ports that a second switch device comprises and uses to connect to the second controller;

the second storage device is connected to one or more other physical ports of the plurality of physical ports that the second switch device comprises; and the first controller is configured to identify the second storage device via the first switch device and the second switch device, and is configured to write system information elements via the first interface device and the second interface device to the second system area of the second storage device.

8. The storage system according to claim 7, wherein the second controller is configured to receive system information elements directly from the first storage system, to modify the received system information elements to content that does not duplicate that of existing system information elements in cases where system information elements that match the received system information elements are included in the second system information, and to write the modified system information elements to the second system area.

9. The storage system according to claim 7, wherein the first storage device includes a plurality of first media drives;

the second storage device includes a plurality of second media drives;

system information elements in the first system information include first drive information that includes, for each of the first media drives, a first drive information element relating to the first media drive, first RAID group information that includes, for each of a plurality of first RAID groups, a first RAID group information element relating to media drives in the first RAID group and/or first logical unit (LU) information that includes, for each of a plurality of first LUs, a first LU information element relating to a first LU that is formed based on the plurality of first media drives;

system information elements in the second system information include second drive information that includes, for each of the second media drives, a second drive information element relating to the second media drive, second RAID group information that includes, for each of a plurality of second RAID groups, a second RAID group information element relating to media drives included in the second RAID group on and/or second LU information that has, for each of a plurality of second LUs, a second LU information element relating to a second LU that is formed based on the plurality of second media drives;

the first drive information is a non-migration target; and the second controller is configured to modify the first RAID group information and/or first LU information based on the second drive information and to write the modified first RAID group information and/or the first LU information to the second system area.

* * * * *